US012437757B1

(12) United States Patent
Eberhardt et al.

(10) Patent No.: US 12,437,757 B1
(45) Date of Patent: Oct. 7, 2025

(54) DEVICE CONFIGURATION USAGE OPTIMIZATION

(71) Applicant: Amazon Technologies, Inc., Seattle, WA (US)

(72) Inventors: Sven Eberhardt, Seattle, WA (US); Maisie Wang, Seattle, WA (US); Akanksha Gupta, Seattle, WA (US); Ryan H Fink, Seattle, WA (US); Kunal Pramod Ghogale, Redmond, WA (US); Soyoung Kim, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 416 days.

(21) Appl. No.: 17/854,520

(22) Filed: Jun. 30, 2022

(51) Int. Cl.
*G10L 15/22* (2006.01)
*G06F 11/34* (2006.01)
*G10L 15/18* (2013.01)

(52) U.S. Cl.
CPC .......... *G10L 15/22* (2013.01); *G06F 11/3438* (2013.01); *G10L 15/1815* (2013.01)

(58) Field of Classification Search
CPC .............................. G10L 15/22; G10L 15/1815
See application file for complete search history.

(56) References Cited

U.S. PATENT DOCUMENTS

| | | | | |
|---|---|---|---|---|
| 11,004,422 | B1 * | 5/2021 | Bull .................... | G06F 16/9577 |
| 2008/0081597 | A1 * | 4/2008 | Cole ....................... | H04W 8/18 455/414.1 |
| 2010/0281147 | A1 * | 11/2010 | O'Leary ............... | H04L 67/125 709/222 |
| 2014/0001963 | A1 * | 1/2014 | Chobot ................ | H05B 47/199 315/153 |
| 2015/0088646 | A1 * | 3/2015 | Mody ................ | G06Q 30/0255 705/14.53 |
| 2017/0331816 | A1 * | 11/2017 | Votaw .................. | H04L 63/0861 |
| 2018/0316702 | A1 * | 11/2018 | Gaspard .............. | H04L 63/1441 |
| 2019/0114478 | A1 * | 4/2019 | Xi ........................ | G06F 3/04883 |
| 2019/0171762 | A1 * | 6/2019 | Luke ....................... | G06F 3/165 |
| 2019/0370812 | A1 * | 12/2019 | Kandasamy ........... | G06N 3/042 |
| 2021/0374030 | A1 * | 12/2021 | Guo ..................... | G06Q 10/063 |
| 2022/0036674 | A1 * | 2/2022 | Harada ................. | H04W 4/021 |
| 2023/0273763 | A1 * | 8/2023 | Kim ........................ | G06F 3/165 381/307 |
| 2023/0396487 | A1 * | 12/2023 | Shetty ................. | H04L 41/5067 |

* cited by examiner

*Primary Examiner* — Daniel C Washburn
*Assistant Examiner* — Paul J. Mueller
(74) *Attorney, Agent, or Firm* — Nicholson De Vos Webster & Elliott LLP

(57) ABSTRACT

Systems and methods for device configuration usage optimization include identifying device configurations that are likely to result in device usage cessation within a predetermined period of time. When device usage cessation is determined to be likely, alternative device configurations are determined that are likely to increase the chances of device usage. One or more recommendations for the alternative device configurations may be sent to user devices, and when accepted, devices may be reconfigured, device functionalities may be enabled, and/or additional devices may be acquired.

20 Claims, 12 Drawing Sheets

DEVICE CONFIGURATION USAGE OPTIMIZATION

BACKGROUND

Internet-of-things devices have become more common in homes and other environments. Some of these devices are operated only for a short period of time by users.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
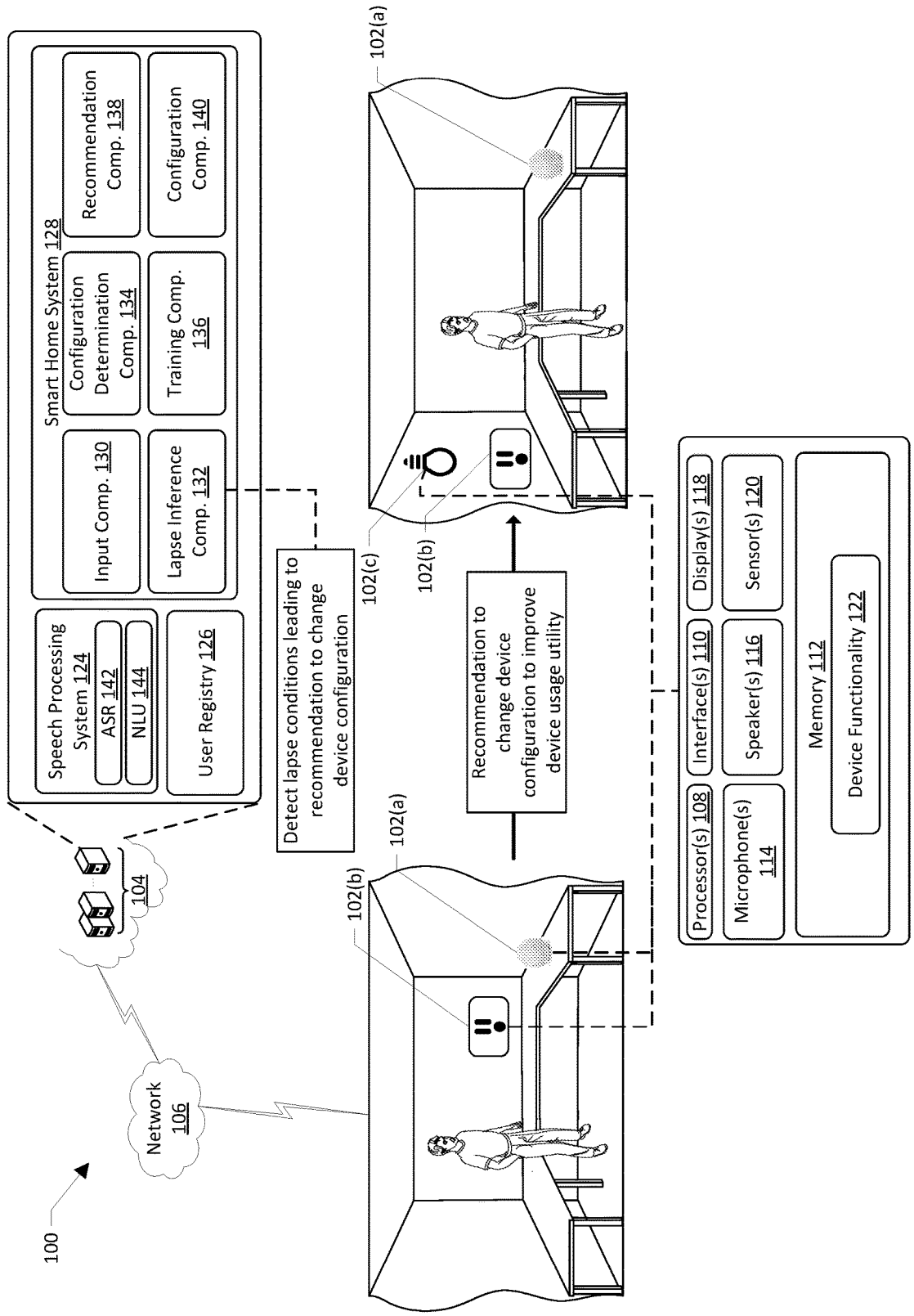
FIG. 1 illustrates a schematic diagram of an example environment for device configuration usage optimization.

Systems and methods for device configuration usage optimization are disclosed. Take, for example, an environment (such as a home, hotel, vehicle, office, store, restaurant, or other space) where one or more users may be present. The environments may include one or more electronic devices that may be utilized by the users or may otherwise be utilized to detect and/or control conditions associated with the environments. For example, the electronic devices may include voice interface devices (e.g., smart speaker devices, mobile phones, tablets, personal computers, televisions, appliances like refrigerators and microwaves, etc.), graphical interface devices (e.g., televisions, set top boxes, virtual/augmented reality headsets, etc.), wearable devices (e.g., smart watch, earbuds, healthcare devices), transportation devices (e.g., cars, bicycles, scooters, etc.), televisions and/or monitors, smart thermostats, security systems (including motion sensors and open/close sensors, including sensors that indicate whether a security system is armed, disarmed, or in a "hoe mode), smart cameras (e.g., home security cameras), and/or touch interface devices (tablets, phones, steering wheels, laptops, kiosks, billboard, other devices with buttons, etc.). These electronic devices may be situated in a home, in a place of business, healthcare facility (e.g., hospital, doctor's office, pharmacy, etc.), in a vehicle (e.g., airplane, truck, car, bus, etc.) in a public forum (e.g., shopping center, store, etc.), and/or at a hotel/quasi-public area, for example.

In these and other scenarios, certain devices may be configured in different ways in given environments. For example, a user may acquire a voice interface device and a smart plug during a holiday season. The user may utilize the smart plug to turn lights on and off during the holiday season. However, for certain users, once conditions for use of the smart plug change, such as when the holiday in question has concluded, the user may stop using the smart plug. Other scenarios where cessation of device usage also occurs includes when a user changes schedules and no longer uses devices in a given room in the same way, when other devices are acquired and used instead of the device in question, etc. In these and other examples, the user may benefit from changing one or more aspects of the configuration of the device such that the device can be repurposed, relocated, or otherwise reconfigured in some way to promote continued and/or increased use of the device in situations where the device usage would have otherwise likely ceased and thereby provide greater value to the user of the device. Additionally, while recommendations to change device configuration would be useful after device usage cessation occurs, it would also be valuable to predict when device usage cessation will occur and recommend device configuration changes prior to when device usage cessation occurs. Predicting device usage cessation can help the user transition the device to a new usage with minimal effort.

In these and other scenarios, a smart home system may be configured to determine when a device configuration of one or more devices associated with given user account data is likely to result in device usage cessation. To do so, an input component of the smart home system may be configured to receive input data from multiple sources. The input data may include, for example, device characteristics about the devices in question, device usage data indicating how a device or set of devices is currently being utilized, and/or user data indicating attributes of the user account at issue. With respect to the device characteristics, data such as device types, device naming indicators, device manufacturers, device capabilities, etc. may be acquired by the input component. With respect to the device usage data, data such as usage counts indicating how many times a device has been used within a given period of time as well as timing data indicating when the device was used may be acquired by the input component. With respect to the user data, data indicating purchase histories, item types, a number of users associated with given user account data, user maturity settings, and associations with other services and devices may be acquired by the input component.

Some or all of this data may be received by the input component, which may format the data for input to a lapse inference component. The lapse inference component may be configured to receive the input data from the input component and may determine a likelihood that a current configuration of a device or a set of devices is likely to lead to device usage cessation. To do so, the lapse inference component may utilize, in addition to the input data, lapse training data that indicates prior device configurations that were associated with device usage cessation. For example, the input data for a given device configuration may indicate that a given device has a device type of a smart plug and that the device has a naming indicator of "Christmas Tree." The input data may also indicate that the device usage count for the device is only two times per day, once in the morning and once in the evening. It should be understood that when the phrase "usage count" is utilized herein, that phrase may include a number of times that a user interacts with a device to cause the device to perform one or more actions. Examples of device usage may include transitioning a state of a device, such as from on to off, from locked to unlocked, from armed to unarmed, etc. Additionally, the device usage may include, for example, a channel being changed on a television, a temperature setting being changed on a thermostat, a light brightness being changed, etc. Additionally, with respect to voice interface devices, the device usage may include detection of a wake word, performance of an action in response to speech input, etc. The input data may also indicate that the user account in question does not include other smart home devices, or that the user account is associated with smart home devices that also have naming indicators associated with a holiday. The lapse inference component may be configured to intake this data and to determine that there is a high likelihood that use of the device in question will decrease and possibly cease altogether following a holiday season. In examples, the lapse inference component may utilize a model, such as a machine learning model, to make the device lapse determinations described herein. In these examples, the machine learning model may be trained utilizing the lapse training data such that factors associated with the input data are identified and utilized to more accurately determine a likelihood of device usage cessation for given device configurations.

When the lapse inference component determines that the likelihood of device usage cessation satisfies a threshold likelihood value, the lapse inference component may send an indication of the likely device usage cessation to a configuration determination component. The configuration determination component may be utilized to identify one or more alternative configurations for the device that may be associated with a decreased likelihood of device usage cessation. To do so, the configuration determination component may utilize, as input, device grouping data, user account data, prior engagement data, prior lapse data, and/or other data types identified as being associated with determining alternative device configurations. For example, the device grouping data may indicate if the device(s) in question are associated with a device group, what other smart home devices are associated with the user account at issue, and/or the characteristics of other devices associated with the user account at issue. Additionally, the user account data may indicate individual user profiles associated with the user account and characteristics of how those user profiles utilize devices. The prior engagement data may indicate a degree of engagement by users of the user account with one or more voice interface devices, smart home devices, and/or a companion application associated with voice interface devices. The prior lapse data may indicate one or more prior determinations of device usage cessation associated with the same device that is at issue and/or other devices. Utilizing some or all of the data described above, the configuration determination component may determine one or more alternative configurations to recommend to the user for the device(s) in question. In some examples, the configuration determination component may utilize a model to make device configuration determinations. In these examples the model may be a machine learning model that may be trained utilizing a configuration training dataset that indicates alternative device configurations and device usage outcomes when device configurations are transitioned to the alternative device configurations. Utilizing the example above of a smart plug with the naming indicator of Christmas Light, the configuration determination component may determine that the user account is also associated with a voice interface device with a naming indicator of "Living Room," and that a smart television also associated with the Living Room is interacted with most evenings. Using at least this data, the configuration determination component may determine that an alternative device configuration for the smart plug is to transition the device to the living room of the environment in question and for the user to plug a lamp or other light emitting device into the smart plug such that the light emitting device can be controlled utilizing the voice interface device that is located in the same room. In this example, the smart plug is utilized for the same purpose (e.g., to turn on lights), but is reconfigured to control a different set of lights. In other examples, the device reconfiguration may be to associate the device in question with a different purpose. For example, a voice interface device may transition from being utilized to receive speech input to being utilized as a motion detector, a smart plug may be transitioned from being utilized to control lights to being utilized to control an appliance, a smart speaker may be transitioned from being utilized to output responses to speech input to being utilized as one of several speakers in a surround sound system and/or a whole home audio experience, etc.

In addition to the device configuration changes described above, the configuration determination component may be utilized to determine one or more functionalities of the device(s) in question that may be enabled to mitigate device usage cessation. For example, smart home devices may be associated with multiple functionality types. Using a smart plug or smart light as an example, the device may be associated with a first functionality such as the light turning on or off when user input is received. However, other functionality may be available but may not be enabled in association with the user account at issue. Such other functionality may include, for example, automatically emitting light when user presence is detected, automatically stopping light emission when user presence is not detected, changing light color when one or more events are detected, outputting light in association with a game or other application available to the user account, etc. By way of another example, a voice interface device may be associated with multiple functionalities. While a given user account may have enabled the ability to perform actions in response to speech input received at the voice interface device, not-yet-enabled functionalities such as utilizing the device as a component of a home security system, using the device to present messages, using the device to automatically display information, etc. may be available. The configuration determination component may utilize the data described herein to identify unenabled functionalities of the device(s) in question and to recommend enablement of such functionalities when doing so is determined to be associated with an increased likelihood of device usage. Also, in addition to device configuration and functionality enablement determinations, the configuration determination component may also be utilized to determine whether acquisition of one or more other devices by the user account will result in increased device usage for the device in question. For example, the configuration determination component may determine that if the user acquired another smart home device that works with the device(s) at issue, the user would likely utilize both the current device and the new smart home device more than if the new smart home device was not acquired.

Utilizing the determinations described above, a recommendation component may be configured to generate and send one or more recommendations to change the device configurations, to change the device functionality, and/or to acquire additional devices. The recommendation component may be configured to determine what type of recommendation to generate and when and how to send that recommendation. For example, the recommendation component may query the user account data at issue to determine user preference data and/or device capability data for devices that may receive the recommendation. The user preference data may indicate user preferences for how the system communicates with users, including for purposes of providing recommendations. The device capability data may indicate whether devices associated with the user account data include speakers, screens, and/or other modalities for outputting the recommendations. Utilizing this data, the recommendation component may format the recommendation to be output by selected device(s) associated with the user account data. Additionally, in examples, determining when to output the recommendation and/or a notification of the recommendation may be determined by the recommendation component. For example, one or more environmental conditions and/or timing conditions may be identified by the recommendation component. Example environmental conditions may include detection of user presence in the environment, detection of certain device states for devices in the environment, detection of certain user interactions such as a user providing speech input to a voice interface device, etc. Example timing conditions may include predefined times and/or ranges of times during a day, predefined days, etc. The recommendation component may determine when the one or more environmental conditions and/or the one or more timing conditions are satisfied and may send the recommendation and/or a notification of the recommendation to one or more devices associated with the user account data.

Thereafter, a user may provide user input indicating acceptance or rejection of the recommendation. Acceptance of the recommendation may cause a configuration component of the system to perform operations associated with reconfiguring the device(s) based at least in part on the recommendation. For example, the configuration component may associate the recommended configuration of the device(s) with the device(s) in the user account data. This may include changing a device type indicator for the device(s), changing a naming indicator of the device(s), changing a location indicator of the device(s), changing device grouping of the device(s), etc. Additionally, when functionality enablement is recommended, the configuration component may cause one or more functionalities associated with the device(s) to be enabled for use by the device(s). Furthermore, when device acquisition is recommended, the configuration component may facilitate acquisition of the recommended device(s).

Additionally, or alternatively, in some examples more than one recommended device configuration may be identified. In these examples, the system may determine whether the recommended device configurations are dissimilar to at least a threshold degree. For example, multiple recommended device configurations may be determined but those configurations may have only subtle differences such as when two recommendations are to change a device type for a given device and where one recommendation is to change a device name to "office light" while the other recommendation is to change the device name to "study light." In a different example, the two recommendations may differ more substantively, such as where one recommendation is to place the device in a living room and to utilize the device for light output purposes and where the other recommendation is to place the device in a bedroom and to utilize the device for appliance control purposes. When recommendations are sufficiently different, the system may determine to send the multiple recommendations to user devices such that the user may select from the multiple options.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for device configuration usage optimization. The system 100 may include, for example, one or more devices 102(a)-(c). In certain examples, the devices 102(a)-(c) may be a voice-enabled device (e.g., smart speaker devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In examples, the devices 102(a)-(c) may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, hotel, etc.), for example. The devices 102(a)-(c) may be configured to send data to and/or receive data from a system 104, such as via a network 106. It should be understood that where operations are described herein as being performed by the system 104, some or all of those operations may be performed by the devices 102(a)-(c). It should also be understood that anytime the system 104 is referenced, that system may include any system and/or device, whether local to an environment of the devices 102(a)-(c) or remote from that environment. Additionally, it should be understood that a given space and/or environment may include numerous devices 102(a)-(c). It should also be understood that when a "space" or "environment" is used herein, those terms mean an area and not necessarily a given room, building, or other structure, unless otherwise specifically described as such.

The devices 102(a)-(c) may include one or more components, such as, for example, one or more processors 108, one or more network interfaces 110, memory 112, one or more microphones 114, one or more speakers 116, one or more displays 118, and/or one or more sensors 120. The microphones 114 may be configured to capture audio, such as user utterances, and generate corresponding audio data. The speakers 116 may be configured to output audio, such as audio corresponding to audio data received from another device. The displays 118 may be configured to display images corresponding to image data, such as image data received from the system 104. The sensors 120 may be configured to detect an environmental condition associated with the devices 102(a)-(c) and/or the environment associated with the devices 102(a)-(c). Some example sensors 120 may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the devices, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. In addition to specific environmental conditions that are detectable by the sensors 120, usage data and/or account data may be utilized to determine if an environmental condition is present. Additionally, the memory 112 may include components such as device functionality 122. The device functionality 122 may include functionality specific to a device 102(a)-(c), such as functionality for turning a light on and off, changing light color and/or brightness, controlling a locking mechanism, adjusting temperature settings, and/or any other functionality associated with a smart device.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 106 and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The system 104 may include components such as, for example, a speech processing system 124, a user registry 126, and/or a smart home system 128. The smart home system 128 may include one or more components such as an input component 130, a lapse inference component 132, a configuration determination component 134, a training component 136, a recommendation component 138, and/or a configuration component 140. It should be understood that while the components of the system 104 are depicted and/or described as separate from each other in FIG. 1, some or all of the components may be a part of the same system. The speech processing system 124 may include an automatic speech recognition component (ASR) 142 and/or a natural language understanding component (NLU) 144. Each of the components described herein with respect to the system 104 may be associated with their own systems, which collectively may be referred to herein as the system 104, and/or some or all of the components may be associated with a single system. Additionally, the system 104 may include one or more applications, which may be described as skills.

"Skills," as described herein may be applications and/or may be a subset of an application. For example, a skill may receive data representing an intent. For example, an intent may be determined by the NLU component 144 and/or as determined from user input via a computing device. Skills may be configured to utilize the intent to output data for input to a text-to-speech component, a link or other resource locator for audio data, and/or a command to a device, such as the devices 102(a)-(c). "Skills" may include applications running on devices, such as the devices 102(a)-(c), and/or may include portions that interface with voice user interfaces of devices 102(a)-(c).

In instances where a voice-enabled device is utilized, skills may extend the functionality of devices 102(a)-(c) that can be controlled by users utilizing a voice-user interface. In some examples, skills may be a type of application that may be useable in association with target devices 102(a)-(c) and may have been developed specifically to work in connection with given target devices 102(a)-(c). Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

Additionally, the operations and/or functionalities associated with and/or described with respect to the components of the system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the system 104, the user registry 126 may be configured to determine and/or generate associations between users, user accounts, environment identifiers, and/or devices. For example, one or more associations between user accounts may be identified, determined, and/or generated by the user registry 126. The user registry 126 may additionally store information indicating one or more applications and/or resources accessible to and/or enabled for a given user account. Additionally, the user registry 126 may include information indicating device identifiers, such as naming identifiers, associated with a given user account, as well as device types associated with the device identifiers. The user registry 126 may also include information indicating user account identifiers, naming indicators of devices associated with user accounts, and/or associations between devices, such as the devices 102(a)-(c). The user registry 126 may also include information associated with usage of the devices 102(a)-(c). It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 124 may be configured to receive audio data from the devices 102(*a*)-(*c*) and/or other devices and perform speech-processing operations. For example, the ASR component 142 may be configured to generate text data corresponding to the audio data, and the NLU component 144 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "turn on bedrooms lights," the NLU component 144 may identify a "smart home" intent. In this example where the intent data indicates an intent to cause a smart home device to operate, the speech processing system 124 may call one or more speechlets and/or applications to effectuate the intent, such as the smart home system 128. Speechlets, as described herein may otherwise be described as applications and may include functionality for utilizing intent data to generate directives and/or instructions. A speechlet of the smart home system 128 may be designated as being configured to handle the intent of causing smart home devices to perform actions, for example. The smart home system 128 may receive the intent data and/or other data associated with the user utterance from the NLU component 144, such as by an orchestrator of the system 104, and may perform operations to cause an action to be performed by the device in question, for example. The system 104 may generate audio data confirming that the action has been performed, such as by a text-to-speech component. The audio data may be sent from the system 104 to one or more of the devices 102(*a*)-(*c*).

The components of the system 100 are described below by way of example. For example, the smart home system 128 may be configured to determine when a device configuration of one or more devices 102(*a*)-(*c*) associated with given user account data is likely to result in device usage cessation. To do so, the input component 130 may be configured to receive input data from multiple sources. The input data may include, for example, device characteristics about the devices 102(*a*)-(*c*) in question, device usage data indicating how a device 102(*a*)-(*c*) or set of devices 102(*a*)-(*c*) is currently being utilized, and/or user data indicating attributes of the user account at issue. With respect to the device characteristics, data such as device types, device naming indicators, device manufacturers, device capabilities, etc. may be acquired by the input component 130. With respect to the device usage data, data such as usage counts indicating how many times a device 102(*a*)-(*c*) has been used within a given period of time as well as timing data indicating whether the device 102(*a*)-(*c*) was used may be acquired by the input component 130. With respect to the user data, data indicating purchase histories, item types, a number of users associated with given user account data, user maturity settings, and associations with other services and devices 102(*a*)-(*c*) may be acquired by the input component 130.

Some or all of this data may be received by the input component 130, which may format the data for input to the lapse inference component 132. The lapse inference component 132 may be configured to receive the input data from the input component 130 and may determine a likelihood that a current configuration of a device 102(*a*)-(*c*) or a set of devices 102(*a*)-(*c*) is likely to lead to device usage cessation. To do so, the lapse inference component 132 may utilize, in addition to the input data, lapse training data that indicates prior device configurations that were associated with device usage cessation. The training component 136 may be utilized to acquire the training data and to train the lapse inference component 132. For example, the input data, for a given device configuration may indicate that a given device 102(*a*)-(*c*) has a device type of a smart plug and that the device 102(*a*)-(*c*) has a naming indicator of "Christmas Tree." The input data may also indicate that the device usage count for the device 102(*a*)-(*c*) is only two times per day, once in the morning and once in the evening. The input data may also indicate that the user account in question does not include other smart home devices, or that the user account is associated with smart home devices that also have naming indicators associated with a holiday. The lapse inference component 132 may be configured to intake this data and to determine there is a high likelihood that use of the device 102(*a*)-(*c*) in question will cease following a holiday season. In examples, the lapse inference component 132 may utilize a model, such as a machine learning model, to make the device lapse determinations described herein. In these examples, the machine learning model may be trained utilizing the lapse training data such that factors associated with the input data are identified and utilized to more accurately determine a likelihood of device usage cessation for given device configurations. The training data may also include, for example, device types at issue, device naming indicators, device grouping information, periods of time since device enablement, etc. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

When the lapse inference component 132 determines that the likelihood of device usage cessation satisfies a threshold likelihood value, the lapse inference component 132 may send an indication of the likely device usage cessation to the configuration determination component 134. The configuration determination component 134 may be utilized to identify one or more alternative configurations for the device 102(*a*)-(*c*) that may be associated with a decreased likelihood of device usage cessation. To do so, the configuration determination component 134 may utilize, as input, device grouping data, user account data, prior engagement data, prior lapse data, and/or other data types identified as being associated with determining alternative device configurations. For example, the device grouping data may indicate if the device(s) 102(*a*)-(*c*) in question are associated with a device group, what other smart home devices are associated with the user account at issue, and/or the characteristics of other devices associated with the user account at issue. Additionally, the user account data may indicate individual user profiles associated with the user account and characteristics of how those user profiles utilize devices 102(*a*)-(*c*). The prior engagement data may indicate a degree of engagement by users of the user account with one or more voice interface devices, smart home devices, and/or a companion application associated with voice interface devices. The prior lapse data may indicate one or more prior determinations of device usage cessation associated with the same device that is at issue and/or other devices. Utilizing some or all of the data described above, the configuration determination component 134 may determine one or more alternative configurations to recommend to the user for the device(s) 102(*a*)-(*c*) in question. In some examples, the configuration determination component 134 may utilize a model to make device configuration determinations. In these examples the model may be a machine learning model that may be trained by the training component 136 utilizing a configuration training dataset that indicates alternative device configurations and device usage outcomes when device configurations are transitioned to the alternative device configurations. Utilizing the example above of a smart plug with the naming indicator of Christmas Light, the configuration determination component 134 may determine that the user account is also associated with a voice interface device with a naming indicator of "Living Room," and that a smart television also associated with the Living Room is interacted with most evenings. Using at least this data, the configuration determination component 134 may determine that an alternative device configuration for the smart plug is to transition the device to the living room of the environment in question and for the user to plug a lamp or other light emitting device into the smart plug such that the light emitting device can be controlled utilizing the voice interface device that is located in the same room. In this example, the smart plug is utilized for the same purpose (e.g., to turn on lights), but is reconfigured to control a different set of lights. In other examples, the device reconfiguration may be to associate the device in question with a different purpose. For example, a voice interface device may transition from being utilized to receive speech input to being utilized as a motion detector, a smart plug may be transitioned from being utilized to control lights to being utilized to control an appliance, a smart speaker may be transitioned from being utilized to output responses to speech input to being utilized as one of several speakers in a surround sound system and/or a whole home audio experience, etc.

In addition to the device configuration changes described above, the configuration determination component 134 may be utilized to determine one or more functionalities of the device(s) 102(*a*)-(*c*) in question that may be enabled to mitigate device usage cessation. For example, smart home devices may be associated with multiple functionality types. Using a smart plug or smart light as an example, the device 102(*a*)-(*c*) may be associated with a first functionality such as the light turning on or off when user input is received. However, other functionality may be available but may not be enabled in association with the user account at issue. Such other functionality may include, for example, automatically emitting light when user presence is detected, automatically stopping light emission when user presence is not detected, changing light color when one or more events are detected, outputting light in association with a game or other application available to the user account, etc. By way of another example, a voice interface device may be associated with multiple functionalities. While a given user account may have enabled the ability to perform actions in response to speech input received at the voice interface device, disabled functionalities such as utilizing the device 102(*a*)-(*c*) as a component of a home security system, using the device 102(*a*)-(*c*) to present messages, using the device 102(*a*)-(*c*) to automatically display information, etc. may be available. The configuration determination component 134 may utilize the data described herein to identify unenabled functionalities of the device(s) 102(*a*)-(*c*) in question and to recommend enablement of such functionalities when doing so is determined to be associated with an increased likelihood of device usage. Also, in addition to device configuration and functionality enablement determinations, the configuration determination component 134 may also be utilized to determine whether acquisition of one or more other devices 102(*c*) by the user account will result in increased device usage for the device 102(*a*)-(*b*) in question. For example, the configuration determination component 134 may determine that if the user acquired another smart home device that works with the device(s) at issue, the user would likely utilize both the current device and the new smart home device more than if the new smart home device was not acquired.

Utilizing the determinations described above, the recommendation component 138 may be configured to generate and send one or more recommendations to change the device configurations, to change the device functionality, and/or to acquire additional devices. The recommendation component 138 may be configured to determine what type of recommendation to generate and when and how to send that recommendation. For example, the recommendation component 138 may query the user account data at issue to determine user preference data and/or device capability data for devices that may receive the recommendation. The user preference data may indicate user preferences for how the system communicates with users, including for purposes of providing recommendations. The device capability data may indicate whether devices associated with the user account data include speakers, screens, and/or other modalities for outputting the recommendations. Utilizing this data, the recommendation component 138 may format the recommendation to be output by selected device(s) associated with the user account data. Additionally, in examples, determining when to output the recommendation and/or a notification of the recommendation may be determined by the recommendation component 138. For example, one or more environmental conditions and/or timing conditions may be identified by the recommendation component. Example environmental conditions may include detection of user presence in the environment, detection of certain device states for devices in the environment, detection of certain user interactions such as a user providing speech input to a voice interface device, etc. Example timing conditions may include predefined times and/or ranges of times during a day, predefined days, etc. The recommendation component 138 may determine when the one or more environmental conditions and the one or more timing conditions are satisfied and may send the recommendation and/or a notification of the recommendation to one or more devices associated with the user account data.

Thereafter, a user may provide user input indicating acceptance or rejection of the recommendation. Acceptance of the recommendation may cause the configuration component 140 to perform operations associated with reconfiguring the device(s) 102(*a*)-(*c*) based at least in part on the recommendation. For example, the configuration component 140 may associate the recommended configuration of the device(s) with the device(s) in the user account data. This may include changing a device type indicator for the device(s) 102(*a*)-(*c*), changing a naming indicator of the device(s) 102(*a*)-(*c*), changing a location indicator of the device(s) 102(*a*)-(*c*), changing device grouping of the device(s) 102(*a*)-(*c*), etc. Additionally, when functionality enablement is recommended, the configuration component 140 may cause one or more functionalities associated with the device(s) 102(a)-(c) to be enabled for use by the device(s) 102(a)-(c). Furthermore, when device acquisition is recommended, the configuration component 140 may facilitate acquisition of the recommended device(s).

Additionally, or alternatively, in some examples more than one recommended device configuration may be identified. In these examples, the system 104 may determine whether the recommended device configurations are dissimilar to at least a threshold degree. For example, multiple recommended device configurations may be determined but those configurations may have only subtle differences such as two recommendations to change a device type as stored for a given device where one recommendation indicates the device name should be changed to "office light" and the other recommendation indicates the device name should be changed to "study light." In another example, the two recommendations may differ more substantively, such as where one recommendation is to place the device in a living room and to utilize the device for light output purposes and where the other recommendation is to place the device in a bedroom and to utilize the device for appliance control purposes. When recommendations are sufficiently different, the system may determine to send the multiple recommendations to user devices such that the user may select from the multiple options.

As used herein, the one or more models and/or the components responsible for detecting likelihood of device usage cessation and/or for determining recommended device configurations may be machine learning models. For example, the machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

As described herein, the machine learning models may be configured to be trained by the training component 136 utilizing a training dataset associated with the prior device usage cessation events and device reconfigurations. The models may be trained for multiple user accounts and/or for a specific user account. As such, the machine learning models may be configured to learn, without human intervention, attributes of collected data and/or actions taken associated with device usage cessation.

It should be noted that while text data is described as a type of data utilized to communicate between various components of the system 104 and/or other systems and/or devices, the components of the system 104 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102(a)-(c).

As shown in FIG. 1, several of the components of the system 104 and the associated functionality of those components as described herein may be performed by one or more of the devices 102(a)-(c). Additionally, or alternatively, some or all of the components and/or functionalities associated with the devices 102(a)-(c) may be performed by the system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108 and/or the processor(s) described with respect to the components of the system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or the processor(s) described with respect to the components of the system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the system 104 may possess its own local memory, which also may store program components, program data, and/or one or more operating systems.

The memory 112 and/or the memory described with respect to the components of the system 104 may include volatile and nonvolatile memory, removable and non-removable media implemented in any method or technology for storage of information, such as computer-readable instructions, data structures, program component, or other data. Such memory 112 and/or the memory described with respect to the components of the system 104 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112 and/or the memory described with respect to the components of the system 104 may be implemented as computer-readable storage media ("CRSM"), which may be any available physical media accessible by the processor(s) 108 and/or the processor(s) described with respect to the system 104 to execute instructions stored on the memory 112 and/or the memory described with respect to the components of the system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112 and/or the memory described with respect to the components of the system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 110 and/or the network interface(s) described with respect to the components of the system 104 may enable messages between the components and/or devices shown in system 100 and/or with one or more other polling systems, as well as other networked devices. Such network interface(s) 110 and/or the network interface(s) described with respect to the components of the system 104 may include one or more network interface controllers (NICs) or other types of transceiver devices to send and receive messages over the network 106.

For instance, each of the network interface(s) 110 and/or the network interface(s) described with respect to the components of the system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or the network interface(s) described with respect to the components of the system 104 may include a wide area network (WAN) component to enable message over a wide area network.

In some instances, the system 104 may be local to an environment associated the devices 102(*a*)-(*c*). For instance, the system 104 may be located within one or more of the devices 102(*a*)-(*c*). In some instances, some or all of the functionality of the system 104 may be performed by one or more of the devices 102(*a*)-(*c*). Also, while various components of the system 104 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 2:
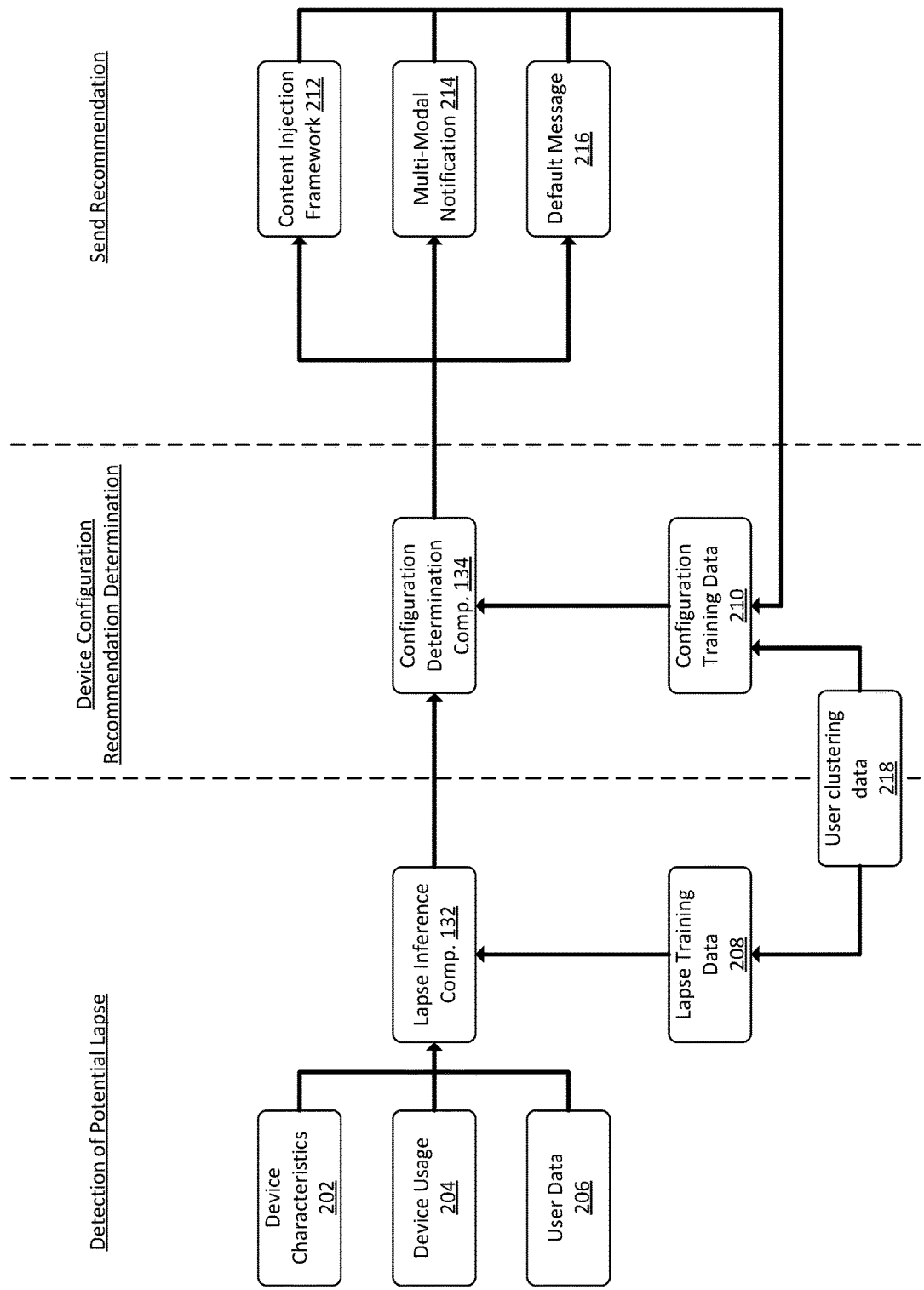
FIG. 2 illustrates a conceptual diagram of example components utilized for device configuration usage optimization.

FIG. 2 illustrates a conceptual diagram of example components utilized for device configuration usage optimization. FIG. 2 may include components that are similar to those described with respect to FIG. 1. For example, FIG. 2 includes a lapse inference component 132 and/or a configuration determination component 134. Additionally, FIG. 2 may include various data types that may be utilized by the lapse inference component 132 and/or the configuration determination component 134. For example, the data may include device characteristics data 202, device usage data 204, user data 206, lapse training data 208, and/or configuration training data 210. Additionally, when recommendations are sent as described herein, a content injection framework 212 may be utilized as described below and multiple types of recommendation messaging may be utilized, such as a multi-modal notification 214 and/or a default message 216.

By way of example, the components of FIG. 2 may be utilized in at least three stages: detection of potential lapse of device usage; device configuration recommendation determination; and sending the recommendation. With respect to detection of potential lapse of device usage, the smart home system described herein may be configured to determine when a device configuration of one or more devices associated with given user account data is likely to result in device usage cessation. To do so, an input component may be configured to receive input data from multiple sources. The input data may include, for example, the device characteristics data 202, the device usage data 204 indicating how a device or set of devices is currently being utilized, and/or the user data 206 indicating attributes of the user account at issue. With respect to the device characteristics data 202, data such as device types, device naming indicators, device manufacturers, device capabilities, etc. may be acquired by the input component. With respect to the device usage data 204, data such as usage counts indicating how many times a device has been used within a given period of time as well as timing data indicating whether the device was used may be acquired by the input component. With respect to the user data, data indicating purchase histories, item types, a number of users associated with given user account data, user maturity settings, and associations with other services and devices may be acquired by the input component.

Some or all of this data may be received by the input component, which may format the data for input to the lapse inference component 132. The lapse inference component 132 may be configured to receive the input data from the input component and may determine a likelihood that a current configuration of a or a set of devices is likely to lead to device usage cessation. To do so, the lapse inference component 132 may utilize, in addition to the input data, the lapse training data 208 that indicates prior device configurations that were associated with device usage cessation. A training component may be utilized to acquire the lapse training data 208 and to train the lapse inference component 132. For example, the input data, for a given device configuration may indicate that a given device has a device type of a smart plug and that the device has a naming indicator of "Christmas Tree." The input data may also indicate that the device usage count for the device is only two times per day, once in the morning and once in the evening. The input data may also indicate that the user account in question does not include other smart home devices, or that the user account is associated with smart home devices that also have naming indicators associated with a holiday. The lapse inference component 132 may be configured to intake this data and to determine there is a high likelihood that use of the device in question will cease following a holiday season. In examples, the lapse inference component 132 may utilize a model, such as a machine learning model, to make the device lapse determinations described herein. In these examples, the machine learning model may be trained utilizing the lapse training data such that factors associated with the input data are identified and utilized to more accurately determine a likelihood of device usage cessation for given device configurations.

When the lapse inference component 132 determines that the likelihood of device usage cessation satisfies a threshold likelihood value, the lapse inference component 132 may send an indication of the likely device usage cessation to the configuration determination component 134. The configuration determination component 134 may be utilized to identify one or more alternative configurations for the device that may be associated with a decreased likelihood of device usage cessation. To do so, the configuration determination component 134 may utilize, as input, device grouping data, user account data, prior engagement data, prior lapse data, device configuration options, functions, and services, device types, identifier lookups, and/or other data types identified as being associated with determining alternative device configurations. For example, the device grouping data may indicate if the device(s) in question are associated with a device group, what other smart home devices are associated with the user account at issue, and/or the characteristics of other devices associated with the user account at issue. Additionally, the user account data may indicate individual user profiles associated with the user account and characteristics of how those user profiles utilize devices. The prior engagement data may indicate a degree of engagement by users of the user account with one or more voice interface devices, smart home devices, and/or a companion application associated with voice interface devices. The prior lapse data may indicate one or more prior determinations of device usage cessation associated with the same device that is at issue and/or other devices. Utilizing some or all of the data described above, the configuration determination component 134 may determine one or more alternative configurations to recommend to the user for the device(s) in question. In some examples, the configuration determination component 134 may utilize a model to make device configuration determinations. In these examples the model may be a machine learning model that may be trained by the training component utilizing the configuration training data 210 that indicates alternative device configurations and device usage outcomes when device configurations are transitioned to the alternative device configurations. Configuration training data can include aggregated usage data across user accounts that can indicate device configurations and combinations that have been utilized by other users that have similar devices under similar circumstances. Utilizing the example above of a smart plug with the naming indicator of Christmas Light, the configuration determination component 134 may determine that the user account is also associated with a voice interface device with a naming indicator of "Living Room," and that a smart television also associated with the Living Room is interacted with most evenings.

Using at least this data, the configuration determination component 134 may determine that an alternative device configuration for the smart plug is to transition the device to the living room of the environment in question and for the user to plug a lamp or other light emitting device into the smart plug such that the light emitting device can be controlled utilizing the voice interface device that is located in the same room. In this example, the smart plug is utilized for the same purpose (e.g., to turn on lights), but is reconfigured to control a different set of lights. In other examples, the device reconfiguration may be to associate the device in question with a different purpose. For example, a voice interface device may transition from being utilized to receive speech input to being utilized as a motion detector, a smart plug may be transitioned from being utilized to control lights to being utilized to control an appliance, a smart speaker may be transitioned from being utilized to output responses to speech input to being utilized as one of several speakers in a surround sound system and/or a whole home audio experience, etc.

In addition to the device configuration changes described above, the configuration determination component 134 may be utilized to determine one or more functionalities of the device(s) in question that may be enabled to mitigate device usage cessation. For example, smart home devices may be associated with multiple functionality types. Using a smart plug or smart light as an example, the device may be associated with a first functionality such as the light turning on or off when user input is received. However, other functionality may be available but may not be enabled in association with the user account at issue. Such other functionality may include, for example, automatically emitting light when user presence is detected, automatically stopping light emission when user presence is not detected, changing light color when one or more events are detected, outputting light in association with a game or other application available to the user account, etc. By way of another example, a voice interface device may be associated with multiple functionalities. While a given user account may have enabled the ability to perform actions in response to speech input received at the voice interface device, disabled functionalities such as utilizing the device as a component of a home security system, using the device to present messages, using the device to automatically display information, etc. may be available. The configuration determination component 134 may utilize the data described herein to identify unenabled functionalities of the device(s) in question and to recommend enablement of such functionalities when doing so is determined to be associated with an increased likelihood of device usage. Also, in addition to device configuration and functionality enablement determinations, the configuration determination component 134 may also be utilized to determine whether acquisition of one or more other devices by the user account will result in increased device usage for the device in question. For example, the configuration determination component 134 may determine that if the user acquired another smart home device that works with the device(s) at issue, the user would likely utilize both the current device and the new smart home device more than if the new smart home device was not acquired.

Utilizing the determinations described above, a recommendation component may be configured to generate and send one or more recommendations to change the device configurations, to change the device functionality, and/or to acquire additional devices. The recommendation 138 may be configured to determine what type of recommendation to generate and when and how to send that recommendation. For example, the recommendation component may query the user account data at issue to determine user preference data and/or device capability data for devices that may receive the recommendation. The user preference data may indicate user preferences for how the system communicates with users, including for purposes of providing recommendations. The device capability data may indicate whether devices associated with the user account data include speakers, screens, and/or other modalities for outputting the recommendations. Utilizing this data, the recommendation component may format the recommendation to be output by selected device(s) associated with the user account data. As shown in FIG. 2, when the device capability data indicates that the device is a multi-modal device that has a screen and a speaker, the multi-modal notification 214 may be sent to the device. This may cause a notification of the available recommendation to be output, and a user may request output of the recommendation by interacting with the notification and/or the device. In other examples, including when device capability information is not available, the recommendation may be sent as a default message 216.

Additionally, in examples, determining when to output the recommendation and/or a notification of the recommendation may be determined by the recommendation component. For example, one or more environmental conditions and/or timing conditions may be identified by the recommendation component. Example environmental conditions may include detection of user presence in the environment, detection of certain device states for devices in the environment, detection of certain user interactions such as a user providing speech input to a voice interface device, etc. Example timing conditions may include predefined times and/or ranges of times during a day, predefined days, etc. The content injection framework 212 may be utilized to determine when the one or more environmental conditions and the one or more timing conditions are satisfied and may send the recommendation and/or a notification of the recommendation to one or more devices associated with the user account data.

Additionally, as shown in FIG. 2, the results of the recommended device reconfigurations may be utilized to further train the configuration determination component 134. For example, when recommendations are surfaced to a user, the user may provide user input indicating acceptance of the recommendations, rejection of the recommendations, and/or user input indicating that the recommendations were not interacted with. This results data may be stored in association with the configuration training data 210 and utilized to train the configuration determination component 134. For example, data indicating recommendations that are frequently accepted may be utilized to more favorably weight such recommendations for future use, while data indicating recommendations that are not frequently accepted may be utilized to less favorably weight such recommendations.

In addition to the above, the system may have access to or otherwise may determine user clustering data 218, which may be utilized to train the lapse inference component 132 and/or the configuration determination component 134. The user clustering data 218 may include, for example, classifications of user profiles associated with a given user account. The classifications may, for example, indicate how likely users are to interact with devices that employ innovative and/or new technology, how likely users are to desire functionality to simplify home-related tasks, how likely users are to desire greater control over certain devices in an environment, how likely a user is to be concerned with data security, how likely a user is to prioritize fun or otherwise less functional smart home interactions over more functional smart home interactions, how likely a user is to need assistance to operate and utilize smart home devices, and/or how likely a user is to be generally interested in smart home functionality. Some or all of these classifications may be utilized to determine how likely device usage lapse is to occur and/or which of several possible device configurations should be recommended to prevent device usage lapse.

FIGS. 3-6 illustrates processes for device configuration usage optimization. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 2, and 7-12, although the processes may be implemented in a wide variety of other environments, architectures and systems.

Figure 3:
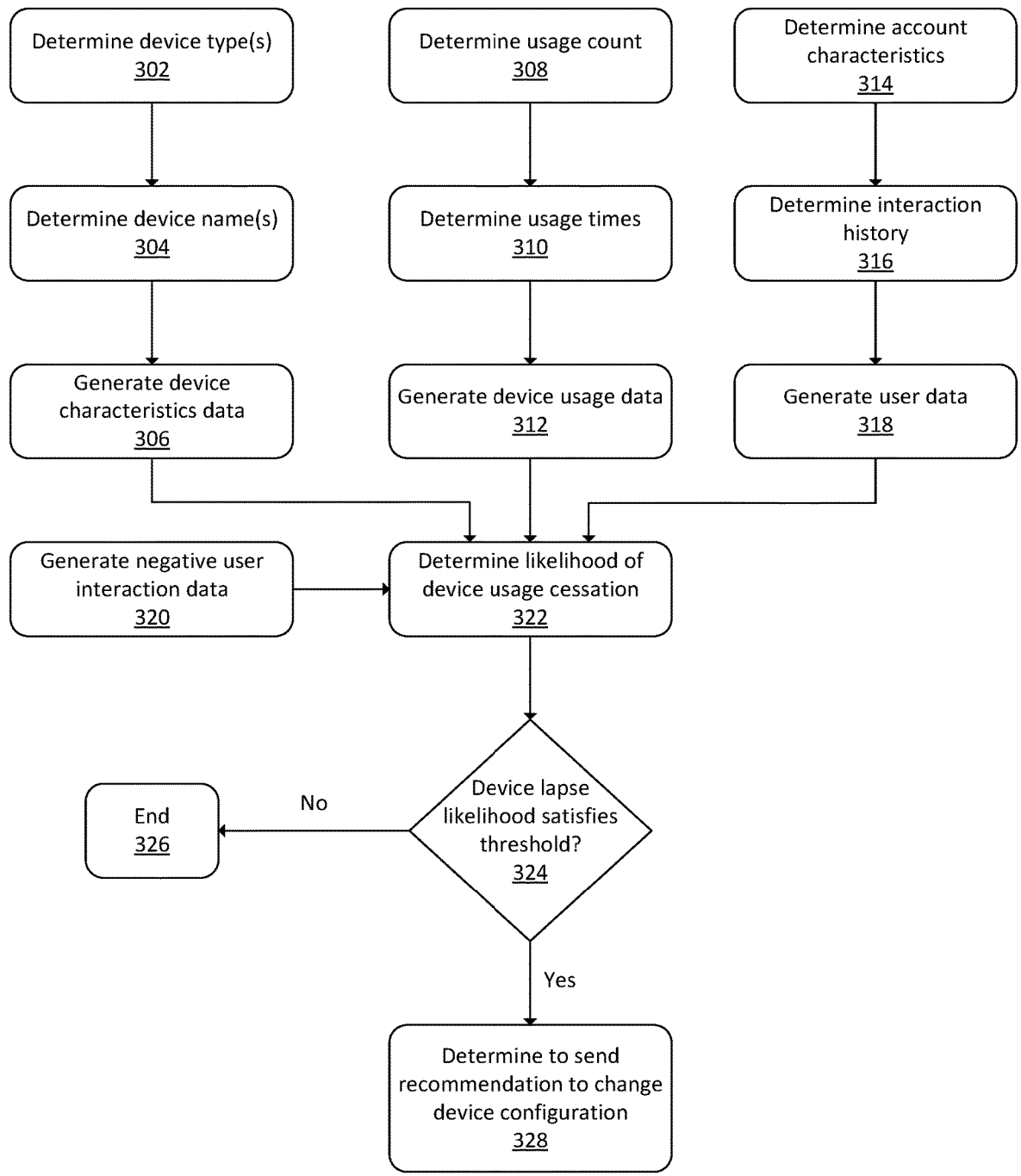
FIG. 3 illustrates a flow diagram of an example process for determining whether a device configuration is likely to result in cessation of device usage.

FIG. 3 illustrates a flow diagram of an example process 300 for determining whether a device configuration is likely to result in cessation of device usage. The order in which the operations or steps are described is not intended to be construed as a limitation, and any number of the described operations may be combined in any order and/or in parallel to implement process 300.

At block 302, the process 300 may include determining one or more device types of the devices associated with user account data. For example, an input component of a smart home system may be configured to receive input data from multiple sources. The input data may include, for example, device characteristics about the devices in question, device usage data indicating how a device or set of devices is currently being utilized, and/or user data indicating attributes of the user account at issue. With respect to the device characteristics, data such as device types, device naming indicators, device manufacturers, device capabilities, etc. may be acquired by the input component. With respect to the device usage data, data such as usage counts indicating how many times a device has been used within a given period of time as well as timing data indicating whether the device was used may be acquired by the input component. With respect to the user data, data indicating purchase histories, item types, a number of users associated with given user account data, user maturity settings, and associations with other services and devices may be acquired by the input component.

For the device types, data indicating device type may be stored in association with user account data. In other examples, the devices themselves may be queried for the device type information and/or a system associated with the devices may be queried for the device type information. Example device types may include, smart lights, smart plugs, voice interface device, smart televisions, smart appliances, smart speakers, smart locks, smart wearable devices, smart security systems, etc. It should be understood that while several example device types are described herein, the device types may be any device types.

At block 304, the process 300 may include determining one or more device names of the devices associated with the user account data. Determining the device names may be performed in the same or a similar manner as determining the device types as described with respect to block 302. The device names may be default names provided prior to set up of the devices and/or may be names given to the devices by a user and/or a system associated with the devices.

At block 306, the process 300 may include generating device characteristics data based at least in part on the device types and the device names. For example, an input component may acquire the device type information and the device name information and may utilize at least this information to generate and format device characteristics data such that the device characteristics data may be input into a lapse inference component.

At block 308, the process 300 may include determining usage counts of the devices associated with the user account data. Determining the usage counts may be performed in the same or a similar manner as determining the device types as described with respect to block 302. The usage counts may indicate how many times a device or set of devices were utilized during a given period of time, such as during a given hour, day, and/or week.

At block 310, the process 300 may include determining usage times of the devices associated with the user account data. Determining the usage times may be performed in the same or a similar manner as determining the device types as described with respect to block 302. The usage times may indicate what day and/or time that a given device was utilized. The usage times may be correlated with the usage counts such that a given usage count is associated with a given usage time.

At block 312, the process 300 may include generating device usage data based at least in part on the usage counts and the usage times. For example, an input component may acquire the usage count data and the usage time data and may utilize at least this information to generate device usage data such that the device usage data may be input into a lapse inference component.

At block 314, the process 300 may include determining account characteristics of the user account data. Determining the account characteristics may be performed in the same or a similar manner as determining device types as described with respect to block 302. In examples, the account characteristics may include a number of users associated with given user account data, user maturity settings, and associations with other services and devices. The account characteristics may indicate subject matters of interest to given users, how devices have or have not been utilized in the past, and usage trends.

At block 316, the process 300 may include determining an interaction history associated with the user account data. Determining the interaction history may be performed in the same or a similar manner as determining device types as describe with respect to block 302. In examples, the interaction history may include purchasing data provided from an ecommerce website associated with users of the user account data. The purchase history may indicate prior item purchases, particularly purchases of smart home devices, as well as item categories that the user(s) have indicated interest in. In other examples, the interaction history may include data indicating prior interactions with a voice interface device, past requests to change device states on smart home devices, past applications utilized in association with the user account data, etc.

At block 318, the process 300 may include generating user data based at least in part on the characteristics of the user account data and the purchasing history. For example, the input component may acquire the user account data and the purchasing history and may utilize at least this information to generate the user data such that the user data may be input into a lapse inference component.

At block 320, the process 300 may include generating negative user interaction data. For example, users may interact with given smart home devices over time. Some of those devices may be voice interface devices configured to capture speech input and to perform actions responsive to the speech input, such as turning on a smart light when speech input requests that the smart light be turned on. In an optimal scenario, the speech input is provided and the speech processing system associated with the voice interface device correctly identifies the action to be performed from the speech input. However, in some examples, the speech processing system may not properly identify the action, may identify the wrong action, may not recognize the speech input, may include detection of processing errors, and/or any other scenario that may lead to a negative user interaction. Data indicating these negative user interactions may be generated and stored in association with the user account data, and this negative user interaction data may be formatted as input to the lapse inference component.

At block 322, the process 300 may include determining a likelihood of device usage cessation based at least in part on the negative user interaction data, the device characteristics data, the device usage data, and/or the user data. For example, the lapse inference component may be configured to receive the input data from the input component and may determine a likelihood that a current configuration of a device or a set of devices is likely to lead to device usage cessation. To do so, the lapse inference component may utilize, in addition to the input data, lapse training data that indicates prior device configurations that were associated with device usage cessation. Lapse training data can include any of the types of data collected in the process for predicting device usage cessation as well as other types of device usage data. For example, the input data, for a given device configuration may indicate that a given device has a device type of a smart plug and that the device has a naming indicator of "Christmas Tree." The input data may also indicate that the device usage count for the device is only two times per day, once in the morning and once in the evening. The input data may also indicate that the user account in question does not include other smart home devices, or that the user account is associated with smart home devices that also have naming indicators associated with a holiday. The lapse inference component may be configured to intake this data and to determine that there is a high likelihood that use of the device in question will cease following a holiday season. In examples, the lapse inference component may utilize a model, such as a machine learning model, to make the device lapse determinations described herein. In these examples, the machine learning model may be trained utilizing the lapse training data such that factors associated with the input data are identified and utilized to more accurately determine a likelihood of device usage cessation for given device configurations.

At block 324, the process 300 may include determining whether the device lapse likelihood satisfies a threshold likelihood value. For example, a value may be associated with the likelihood of device usage lapse or similar prediction confidence value and that value may be associated with a likelihood scale. The system may determine, statically or dynamically, a likelihood value threshold that, if satisfied indicates that the likelihood of device usage lapse is great enough for a device reconfiguration recommendation to be sent.

In examples where the device usage cessation likelihood does not satisfy the threshold likelihood value, the process 300 may end at block 326. In these examples, while some likelihood of device usage cessation was determined, the system determined that the likelihood is not greater enough to recommend changing a device configuration of one or more devices. In one example, the threshold can be that the device cessation is more likely than not (i.e., greater than 50%).

In examples where the device usage cessation likelihood satisfies the threshold likelihood value, the process 300 may include, at block 328, determining to send a recommendation to change the device configuration. For example, a configuration determination component may be utilized to identify one or more alternative configurations for the device that may be associated with a decreased likelihood of device usage cessation. To do so, the configuration determination component may utilize, as input, device grouping data, user account data, prior engagement data, prior lapse data, and/or other data types identified as being associated with determining alternative device configurations. For example, the device grouping data may indicate if the device(s) in question are associated with a device group, what other smart home devices are associated with the user account at issue, and/or the characteristics of other devices associated with the user account at issue. Additionally, the user account data may indicate individual user profiles associated with the user account and characteristics of how those user profiles utilize devices. The prior engagement data may indicate a degree of engagement by users of the user account with one or more voice interface devices, smart home devices, and/or a companion application associated with voice interface devices. The prior lapse data may indicate one or more prior determinations of device usage cessation associated with the same device that is at issue and/or other devices. Utilizing some or all of the data described above, the configuration determination component may determine one or more alternative configurations to recommend to the user for the device(s) in question. In some examples, the configuration determination component may utilize a model to make device configuration determinations. In these examples the model may be a machine learning model that may be trained utilizing a configuration training dataset that indicates alternative device configurations and device usage outcomes when device configurations are transitioned to the alternative device configurations. Utilizing the example above of a smart plug with the naming indicator of Christmas Light, the configuration determination component may determine that the user account is also associated with a voice interface device with a naming indicator of "Living Room," and that a smart television also associated with the Living Room is interacted with most evenings. Using at least this data, the configuration determination component may determine that an alternative device configuration for the smart plug is to transition the device to the living room of the environment in question and for the user to plug a lamp or other light emitting device into the smart plug such that the light emitting device can be controlled utilizing the voice interface device that is located in the same room. In this example, the smart plug is utilized for the same purpose (e.g., to turn on lights), but is reconfigured to control a different set of lights. In other examples, the device reconfiguration may be to associate the device in question with a different purpose. For example, a voice interface device may transition from being utilized to receive speech input to being utilized as a motion detector, a smart plug may be transitioned from being utilized to control lights to being utilized to control an appliance, a smart speaker may be transitioned from being utilized to output responses to speech input to being utilized as one of several speakers in a surround sound system and/or a whole home audio experience, etc.

Figure 4:
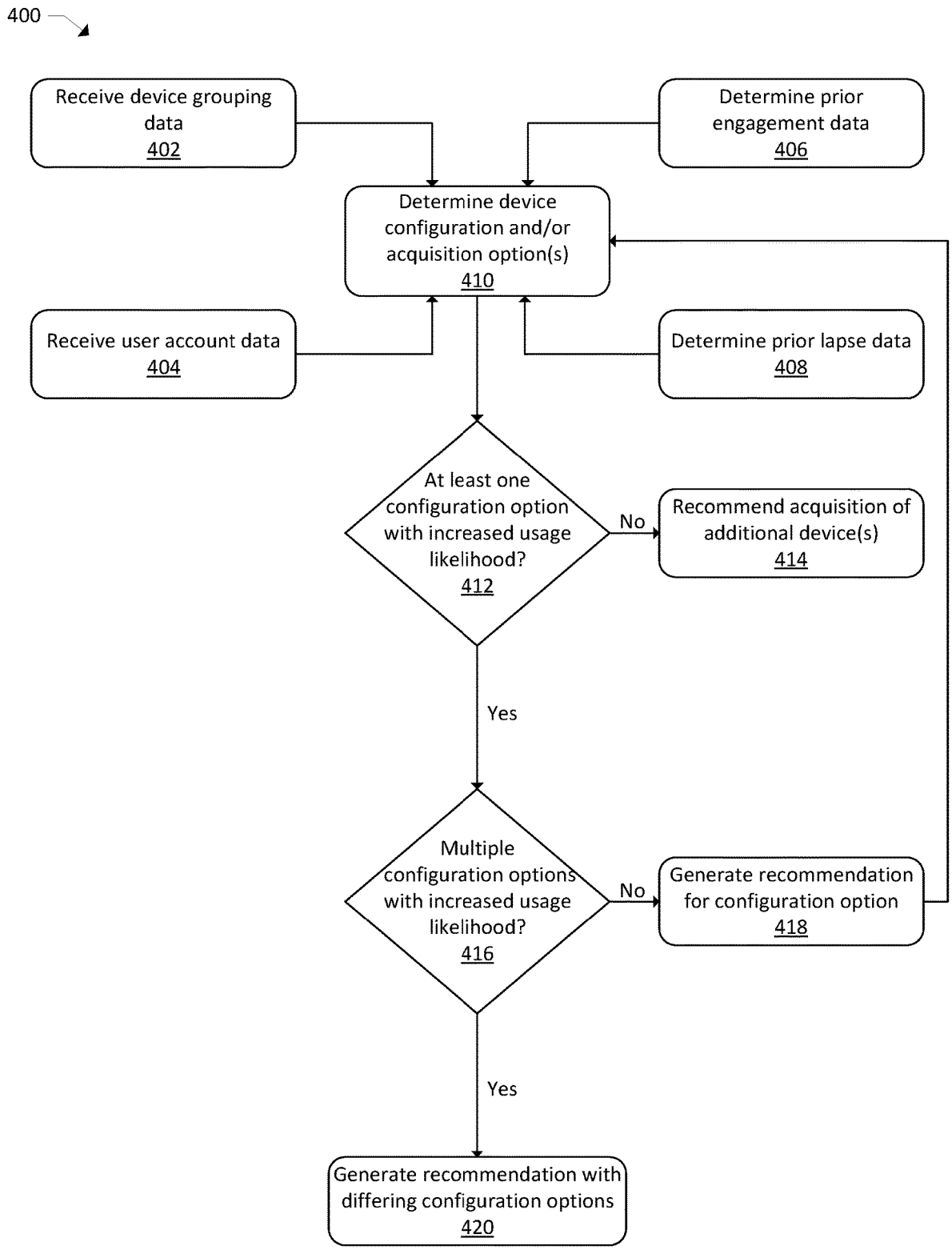
FIG. 4 illustrates a flow diagram of an example process for determining an alternate device configuration when cessation of device usage is likely to occur.

FIG. 4 illustrates a flow diagram of an example process 400 for determining an alternate device configuration when cessation of device usage is likely to occur. The order in which the operations or steps are described is not intended to be construed as a limitation, and any number of the described operations may be combined in any order and/or in parallel to implement process 400.

At block 402, the process 400 may include receiving device grouping data for devices associated with user account data. For example, the device grouping data may indicate if the device(s) in question are associated with a device group, what other smart home devices are associated with the user account at issue, and/or the characteristics of other devices associated with the user account at issue. The device grouping data may be acquired from user account data, from a system associated with the devices, and/or from querying the devices themselves for the device grouping data.

At block 404, the process 400 may include receiving user account data. For example, the user account data may indicate individual user profiles associated with the user account and characteristics of how those user profiles utilize devices. Acquisition of the user account data may be performed in the same or a similar manner as described with respect to receiving the device grouping data from block 402.

At block 406, the process 400 may include determining prior engagement data associated with the user account data. The prior engagement data may indicate a degree of engagement by users of the user account with one or more voice interface devices, smart home devices, and/or a companion application associated with voice interface devices. Acquisition of the prior engagement data may be performed in the same or a similar manner as described with respect to receiving the device grouping data from block 402.

At block 408, the process 400 may include determining prior lapse data associated with the user account data. The prior lapse data may indicate one or more prior determinations of device usage cessation associated with the same device that is at issue and/or other devices. Acquisition of the prior lapse data may be performed in the same or a similar manner as described with respect to receiving the device grouping data from block 402.

At block 410, the process 400 may include determining configuration and/or acquisition options. For example, a configuration determination component may be utilized to identify one or more alternative configurations for the device that may be associated with a decreased likelihood of device usage cessation. To do so, the configuration determination component may utilize, as input, device grouping data, user account data, prior engagement data, prior lapse data, and/or other data types identified as being associated with determining alternative device configurations. For example, the device grouping data may indicate if the device(s) in question are associated with a device group, what other smart home devices are associated with the user account at issue, and/or the characteristics of other devices associated with the user account at issue. Additionally, the user account data may indicate individual user profiles associated with the user account and characteristics of how those user profiles utilize devices. The prior engagement data may indicate a degree of engagement by users of the user account with one or more voice interface devices, smart home devices, and/or a companion application associated with voice interface devices. The prior lapse data may indicate one or more prior determinations of device usage cessation associated with the same device that is at issue and/or other devices. Utilizing some or all of the data described above, the configuration determination component may determine one or more alternative configurations to recommend to the user for the device(s) in question. In some examples, the configuration determination component may utilize a model to make device configuration determinations. In these examples the model may be a machine learning model that may be trained utilizing a configuration training dataset that indicates alternative device configurations and device usage outcomes when device configurations are transitioned to the alternative device configurations. Utilizing the example above of a smart plug with the naming indicator of Christmas Light, the configuration determination component may determine that the user account is also associated with a voice interface device with a naming indicator of "Living Room," and that a smart television also associated with the Living Room is interacted with most evenings. Using at least this data, the configuration determination component may determine that an alternative device configuration for the smart plug is to transition the device to the living room of the environment in question and for the user to plug a lamp or other light emitting device into the smart plug such that the light emitting device can be controlled utilizing the voice interface device that is located in the same room. In this example, the smart plug is utilized for the same purpose (e.g., to turn on lights), but is reconfigured to control a different set of lights. In other examples, the device reconfiguration may be to associate the device in question with a different purpose. For example, a voice interface device may transition from being utilized to receive speech input to being utilized as a motion detector, a smart plug may be transitioned from being utilized to control lights to being utilized to control an appliance, a smart speaker may be transitioned from being utilized to output responses to speech input to being utilized as one of several speakers in a surround sound system and/or a whole home audio experience, etc. Additionally, as described elsewhere herein in more detail, the options may include an option to acquire another device that may be utilized in association with the device at issue to mitigate device usage cessation.

At block 412, the process 400 may include determining whether at least one configuration option is associated with an increased usage likelihood. For example, the configuration determination component may determine that there is an available configuration option for the device(s) in question that is likely to result in device usage where device usage cessation was otherwise likely. However, in other examples, the configuration determination component may determine that a device reconfiguration for the device(s) at issue is unlikely to result in increased device usage.

In examples where at least one configuration option is not associated with an increased usage likelihood, the process 400 may include, at block 414, recommending acquisition of at least one other device. In this example, the configuration determination component may determine that device usage is likely to increase if another device was also present in the environment. For example, a user may not utilize a smart speaker to output music, but acquisition of another smart speaker that could be set up with the original smart speaker as a surround sound system may lead to increased usage of the original smart speaker.

In examples where at least one configuration option is associated with an increased usage likelihood, the process 400 may include, at block 416, determining whether multiple configuration options indicate increased usage likelihood. For example, sometimes a single reconfiguration option is determined to have an increased likelihood of device usage. In other examples, multiple reconfiguration options may be identified.

In examples where only one configuration option is associated with an increased usage likelihood, the process 400 may include, at block 418, generating a recommendation for the configuration option. In this example, given that only one reconfiguration option was determined, a recommendation component may generate and send a recommendation to reconfigure the device(s) at issue utilizing the identified device reconfiguration. In some examples, the results of block 418 may be configured as feedback data that may be utilized in association with subsequent determinations of alternative device configurations and/or acquisition options, as described with respect to block 410.

In examples where more than one configuration option is associated with an increased usage likelihood, the process 400 may include, at block 420, generating a recommendation with differing configuration options. In this example, multiple device reconfiguration options may be available, but the system may determine which of those reconfiguration options should be presented to a user to optimize likelihood that the user will at least one of the recommendations. For example, multiple recommended device configurations may be determined but those configurations may have only subtle differences such as two recommendations to change a device type as stored for a given device where one recommendation indicates the device name should be changed to "office light" and the other recommendation indicates the device name should be changed to "study light." In another example, the two recommendations may differ more substantively, such as where one recommendation is to place the device in a living room and to utilize the device for light output purposes and where the other recommendation is to place the device in a bedroom and to utilize the device for appliance control purposes. When recommendations are sufficiently different, the system may determine to send the multiple recommendations to user devices such that the user may select from the multiple options. By so doing, deduplication of similar recommendations may be performed and utilized to enhance the user experience when interacting with the surfaced recommendations.

Figure 5:
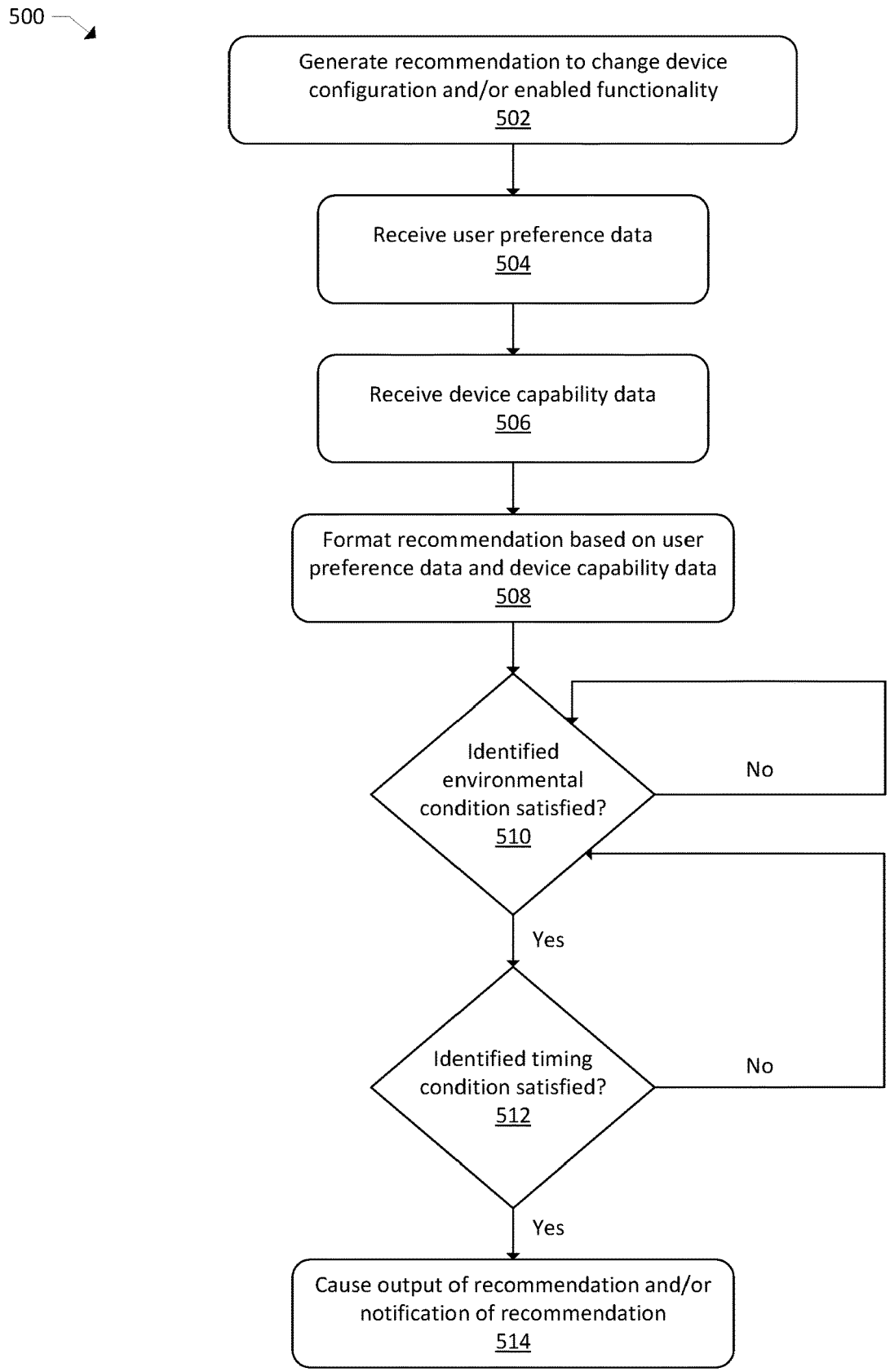
FIG. 5 illustrates a flow diagram of an example process for determining how and when to surface a recommendation to alter a device configuration.

FIG. 5 illustrates a flow diagram of an example process 500 for determining how and when to surface a recommendation to alter a device configuration. The order in which the operations or steps are described is not intended to be construed as a limitation, and any number of the described operations may be combined in any order and/or in parallel to implement process 500.

At block 502, the process 500 may include generating a recommendation to change device configuration and/or the enable functionality associated with a device. For example, a recommendation component may be configured to generate and send one or more recommendations to change the device configurations, to change the device functionality, and/or to acquire additional devices. The recommendation component may be configured to determine what type of recommendation to generate and when and how to send that recommendation.

At block 504, the process 500 may include receiving user preference data. For example, the recommendation component may query user account data at issue to determine user preference data and/or device capability data for devices that may receive the recommendation. The user preference data may indicate user preferences for how the system communicates with users, including for purposes of providing recommendations.

At block 506, the process 500 may include receiving device capability data. For example, the device capability data may indicate whether devices associated with the user account data include speakers, screens, and/or other modalities for outputting the recommendations.

At block 508, the process 500 may include formatting the recommendation based at least in part on the user preference data and the device capability data. For example, if the user preference data specifies that recommendations are to be sent to a personal device, the recommendation at issue may be formatted to be output on that device. In other examples, the user preference data and/or the device capability data may indicate that the recommendation is to be sent to a screenless device, and thus the recommendation may be formatted as audio data to be output by a speaker.

At block 510, the process 500 may include determining whether an identified environmental condition has been satisfied. For example, determining when to output the recommendation and/or a notification of the recommendation may be determined by the recommendation component. For example, one or more environmental conditions and/or timing conditions may be identified by the recommendation component. Example environmental conditions may include detection of user presence in the environment, detection of certain device states for devices in the environment, detection of certain user interactions such as a user providing speech input to a voice interface device, etc. The recommendation component may determine when the one or more environmental conditions are satisfied and may send the recommendation and/or a notification of the recommendation to one or more devices associated with the user account data.

In examples where an identified environmental condition has not been satisfied, the process 500 may revert back to block 510 where the system may determine when the identified environmental condition is satisfied.

In examples where the identified environmental condition is satisfied, the process 500 may include, at block 512, determining whether an identified timing condition has been satisfied. Example timing conditions may include predefined times and/or ranges of times during a day, predefined days, etc. The recommendation component may determine when the one or more timing conditions are satisfied and may send the recommendation and/or a notification of the recommendation to one or more devices associated with the user account data.

In examples where the identified timing condition has not been satisfied, the process 500 may revert back to block 510 where determining when the identified environmental condition may be performed.

In examples where the identified timing condition is satisfied, the process 500 may include, at block 514, causing output of the recommendation and/or a notification of the recommendation. By so doing, the recommendation may output when a content injection framework indicates it is desirable to do so. For example, a user may request that a smart light be turned off, such as at 9:00 pm. In this example, but the environmental condition of turning a light from on to off and the timing condition of 9:00 pm may indicate that the recommendation should not be output at that time. Conversely, a user requesting a morning news briefing, asking for the weather, ordering products, etc. may indicate an environmental condition of a user being present and engaged with a voice interface device. Other environmental conditions may be detection of user presence, detection of a specific user using speaker identification techniques, detection of smart home device states, detection of environmental states such as an awake state, etc. While the environmental and timing conditions are shown in sequence, these conditions can be checked or applied in any order or combination with any number of each type of condition.

Figure 6:
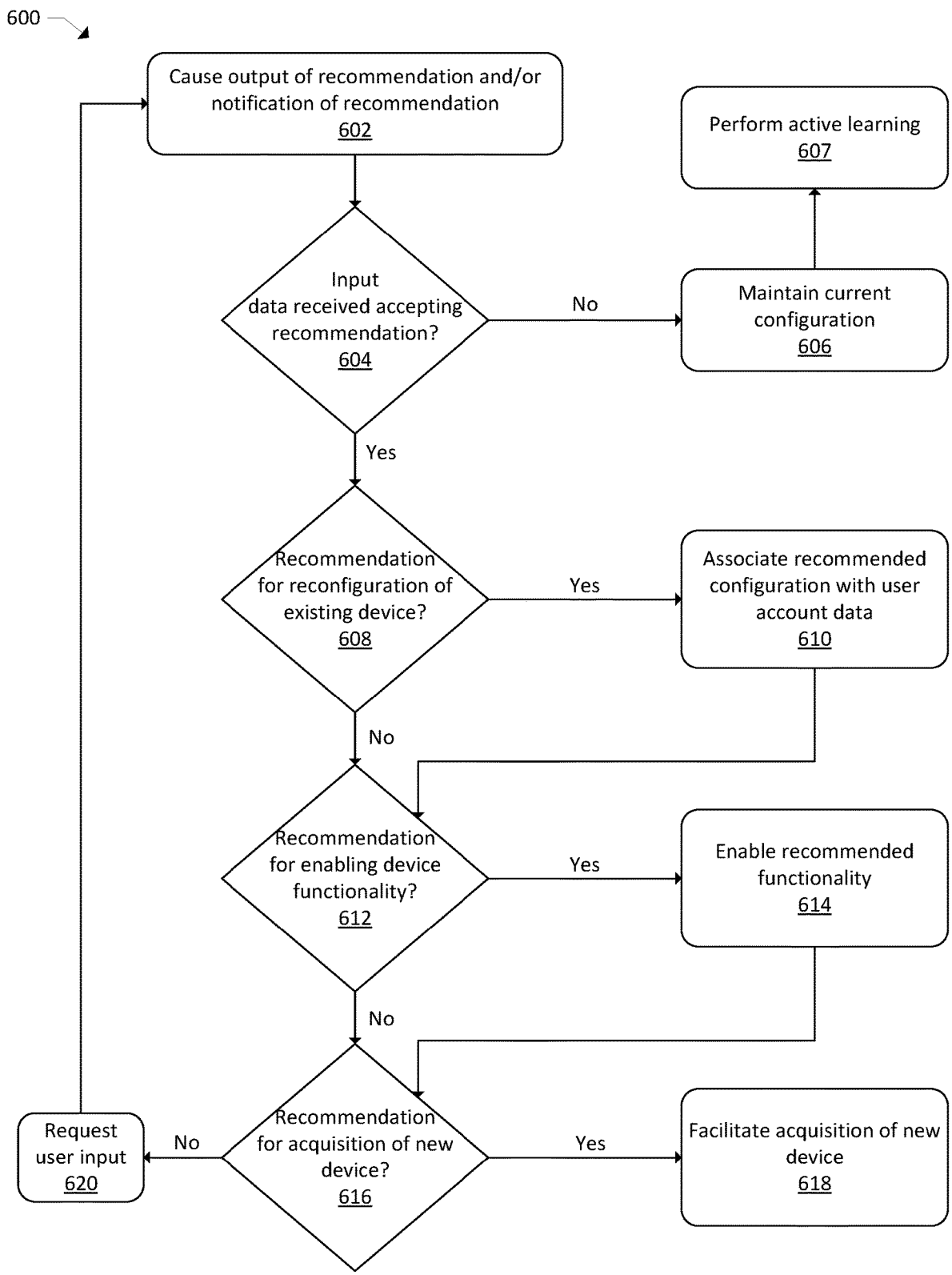
FIG. 6 illustrates a flow diagram of an example process for performing one or more actions in response to user input data accepting a recommendation associated with likely cessation of device usage.

FIG. 6 illustrates a flow diagram of an example process 600 for performing one or more actions in response to user input data accepting a recommendation associated with likely cessation of device usage. The order in which the operations or steps are described is not intended to be construed as a limitation, and any number of the described operations may be combined in any order and/or in parallel to implement process 600.

At block 602, the process 600 may include causing output of a recommendation and/or notification of the recommendation to reconfigure one or more devices. For example, data representing the recommendation may be sent to a device associated with the user account data, and the recommendation may be output to the user. The recommendation may indicate the requested device reconfiguration, requested functionality enablement, and/or requested device acquisition as described herein.

At block 604, the process 600 may include determining whether input data is received accepting the recommendation. For example, a user may provide user input indicating acceptance or rejection of the recommendation. Acceptance of the recommendation may cause a configuration component of the system to perform operations associated with reconfiguring the device(s) based at least in part on the recommendation.

In examples where input data is not received accepting the recommendation or when input data is received that expressly rejects the recommendation, the process 600 may include, at block 606, maintaining a current configuration of the device(s). In this example, while a device reconfiguration recommendation was sent based on a likelihood of increased device usage if the device(s) at issue were reconfigured, the user may have decided not to accept the recommendation. A such, the system may determine to refrain from reconfiguring the device(s). In some cases, alternate recommendations can then be generated and provided to the user.

At block 607, the process 600 may include performing active learning based at least in part on determining that the user has not expressed an intent to accept the recommendation. For example, the active learning processing may include generating feedback data indicating the recommendation was not accepted and utilizing the feedback data to further train the configuration determination component, as described herein. In instances where only a portion of the recommendation is accepted, feedback data indicating this selective acceptance may be generated and utilized to train the configuration determination component. Additionally, in examples, the active learning may include determining, based at least in part on the user not accepting the recommendation, an alternative recommendation to surface to the user. For example, user input may be received indicating that the user has responded favorably to past recommendations but not to the recommendation at issue. In these and other examples, the system may determine to send an alternative recommendation with a different recommended device configuration.

In examples where input data is received accepting the recommendation, the process 600 may include, at block 608, determining whether the recommendation is for reconfiguration of an existing device. As outlined above, the recommendation may take many forms, including device reconfiguration, device functionality enablement, and/or new device acquisition. The system may determine if the recommendation at least in part is about reconfiguring an existing device.

In examples where the recommendation is for reconfiguration of an existing device, the process 600 may include, at block 610, associating the recommended configuration with the device in user account data. For example, the device type as stored in association with the user account data may be changed to the recommended device type, the naming indicator of the device may be changed, a location where the device is identified as being situated may be changed, an association of the device with other devices may change, and/or any other attribute of the device may be configured based on the recommendation.

In examples where the recommendation is not for reconfiguration of an existing device, and/or after the operations performed with respect to block 610, the process 600 may include, at block 612, determining whether the recommendation is for enabling device functionality. For example, smart home devices may be associated with multiple functionality types. Using a smart plug or smart light as an example, the device may be associated with a first functionality such as the light turning on or off when user input is received. However, other functionality may be available but may not be enabled in association with the user account at issue. Such other functionality may include, for example, automatically emitting light when user presence is detected, automatically stopping light emission when user presence is not detected, changing light color when one or more events are detected, outputting light in association with a game or other application available to the user account, etc. By way of another example, a voice interface device may be associated with multiple functionalities.

In examples where the recommendation is for enabling device functionality, the process 600 may include, at block 614, enabling the recommended device functionality. For example, while a given user account may have enabled the ability to perform actions in response to speech input received at the voice interface device, disabled functionalities such as utilizing the device as a component of a home security system, using the device to present messages, using the device automatically display information, etc. may be available. The configuration determination component may utilize the data described herein to identify unenabled functionalities of the device(s) in question and to recommend enablement of such functionalities when doing so is determined to be associated with an increased likelihood of device usage.

In examples where the recommendation is not for enabling device functionality, and/or after the processes described at block 614, the process 600 may include, at block 616, determining whether the recommendation is for acquisition of a new device. For example, in addition to device configuration and functionality enablement determinations, the configuration determination component may also be utilized to determine whether acquisition of one or more other devices by the user account will result in increased device usage for the device in question. For example, the configuration determination component may determine that if the user acquired another smart home device that works with the device(s) at issue, the user would likely utilize both the current device and the new smart home device more than if the new smart home device was not acquired.

In examples where the recommendation is for acquisition of a new device, the process 600 may include, at block 618, facilitating acquisition of the new device. For example, the user account data may be utilized to pay for purchase of the new device and for identifying a shipping address for sending the device to. The user account data may also be utilized to automatically set up the device based at least in part on the recommended device configuration. In cases where a new device is recommended or other physical reconfiguration of available devices is a pre-requisite, the transition to the new configuration for the recommendation can be delayed until the new device and/or physical reconfiguration is detected.

In examples where the recommendation is not for acquisition of the new device, the process 600 may include, at block 620, requesting user input from the user to ascertain how to reconfigure the device(s). In this example, user input data was received related to a device reconfiguration recommendation, but performing the reconfiguration caused one or more errors to occur. In these examples, further user input may be requested to assist in determining how to reconfigure the device(s) at issue. In some examples, the user input may be utilized as feedback data for determining how and/or when to output subsequent recommendations, such as described with respect to block 602.

Figure 7:
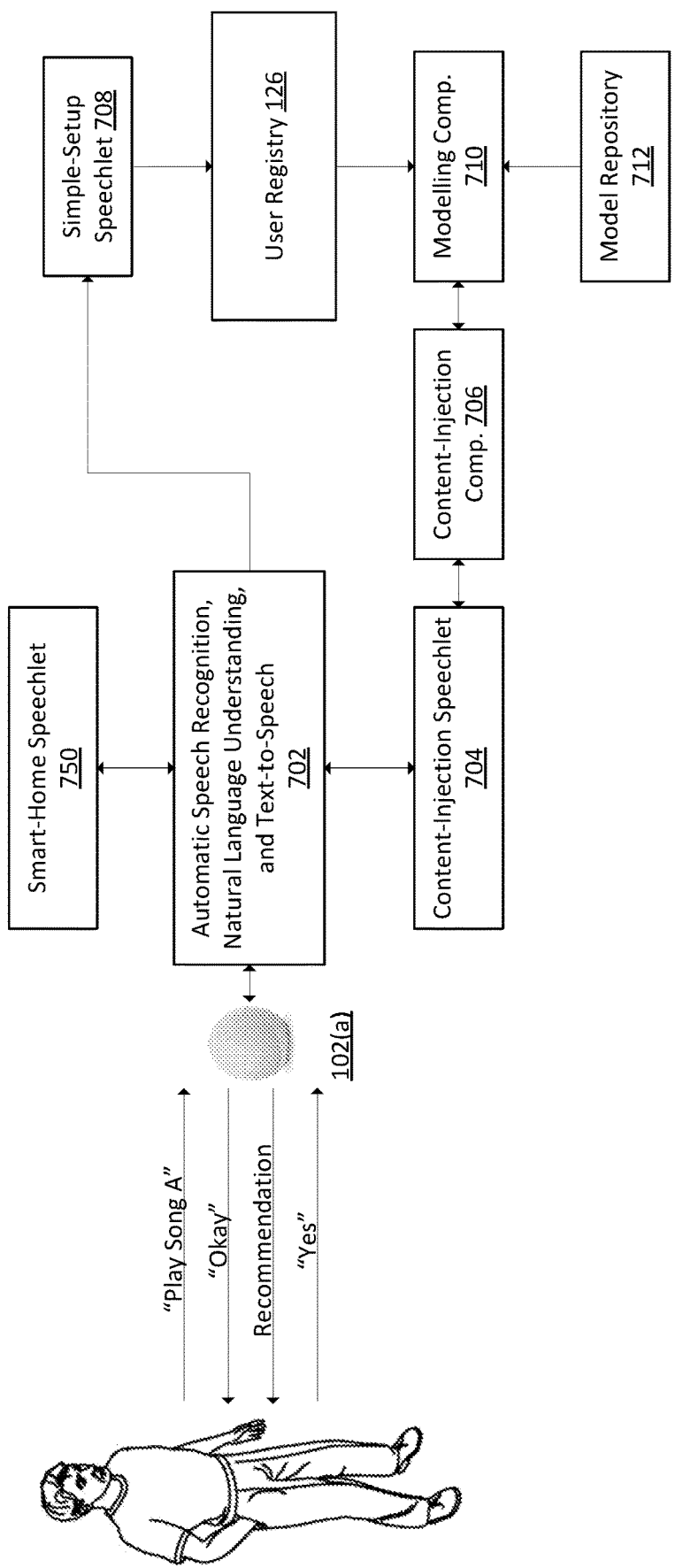
FIG. 7 illustrates a conceptual diagram of components utilized for determining when to output recommendations for device configuration usage optimization.

FIG. 7 illustrates a conceptual diagram of components utilized for determining when to output recommendations for device configuration usage optimization. The environment illustrated with respect to FIG. 7 shows conceptual components of the system 104 along with a voice interface device 102(a) and a user interacting therewith. FIG. 7 describes the functionality of the system 104 in the context of an example user utterance provided by the user.

For example, the user may provide a user utterance such as "play Song A." The microphones of the voice interface device 102(a) may capture audio corresponding to the user utterance and may generate audio data. The audio data may be sent from the voice interface device 102(a) to a speech processing system, such as the speech processing system 124. An ASR component 142 may generate text data corresponding to the audio data. An NLU component 144 may generate, based at least in part on the audio data, intent data representing an intent to perform an action. A text-to-speech (TTS) component may generate audio data from text data for output via speakers of the voice interface device 102(a). The ASR component 142, NLU component 144, and TTS component are described in more detail with respect to FIG. 10. In the example provided with respect to FIG. 7, the intent may be, for example, to "play" or otherwise output audio for content with the naming indicator of "Song A." Based at least in part on the intent data, a speechlet configured to handle the intent may be utilized. For example, a smart-home speechlet 750 may receive the intent data and may utilize that intent data to generate directive data representing a directive for the voice interface device 102(a) to output audio for Song A.

Additionally, in examples, a text-to-speech (TTS) component of the system 104 may be utilized to generate audio data corresponding to a response to the user utterance. In the example of FIG. 7, the system 104 may successfully identify the intent of the user utterance and may successfully cause Song A to be output. In these examples, the TTS component may be utilized to generate and/or identify confirmatory audio data. The audio data may be sent to the voice interface device 102(a) for output by speakers of the voice interface device 102(a). Here, the audio data may correspond to audio of "okay," indicating that the user utterance was processed successfully.

Additionally, the system 104 may provide a recommendation to the user as described herein. For example, a recommendation may be provided based at least in part on the user providing the user utterance and/or the audio data corresponding to the user utterance being received by the system 104. A modelling component 710 may be configured to utilize data stored in the user registry 126 to determine and/or predict useful information to be utilized by the system 104. For example, the modelling component 710 may include one or more models, such as one or more lapse inference models and/or one or more configuration determination models. The models may be stored in a model repository 712.

The content-injection speechlet 704 may be configured to interface between the modelling component 710 and other components of the system 104, such as the ASR component 142 and/or the NLU component 144. For example, when recommendation data is generated as described herein, the content-injection speechlet 704 may be utilized to generate directive data to be sent to the voice interface device 102(a) for output of the recommendation to the user. Additionally, the user's response may be captured by the voice interface device 102(a) and the content-injection component 706 may be configured to utilize the response to perform actions, such as transitioning a configuration of a device, for example. As shown in FIG. 7, the content-injection speechlet 704 may be utilized to inject the recommendation data into the flow of interactions with the user. For example, in addition to outputting audio indicating that the user utterance was successfully processed, here illustrated as "okay," the content-injection speechlet 704 may cause audio data corresponding to the recommendation to be sent to the voice interface device 102(a) for output.

For example, the recommendation of "would you like to use Device A to turn on your lamp?" may be output by the speakers of the voice interface device 102(a). The user may then provide a user utterance of "yes," which may be captured by the microphones of the voice interface device 102(a) and corresponding audio data may be generated and sent to the system 104. The audio data may be analyzed and intent data indicating an intent to accept the recommendation may be generated. Thereafter, a simple-setup speechlet 708 may be called to generate the association between the device and the recommended configuration. Data indicating the state transition, or in other examples functionality enablement and/or device acquisition, may be stored, for example, the user registry 126.

The content injection component 706 may be a framework that may allow developers to enhance user interaction by injecting content and/or directive data into available opportunity slots associated with intent data. The slots may be time periods when the customer is open to new interactions. As illustrated in FIG. 7, the time period is after a user provides a user utterance to the voice interface device 102(a) and while that user utterance is being processed. Other example time periods may be different times of the day, days of the week, after and/or before a user may take a particular action such as interacting with a companion application on a personal device associated with the user, etc.

Figure 8:
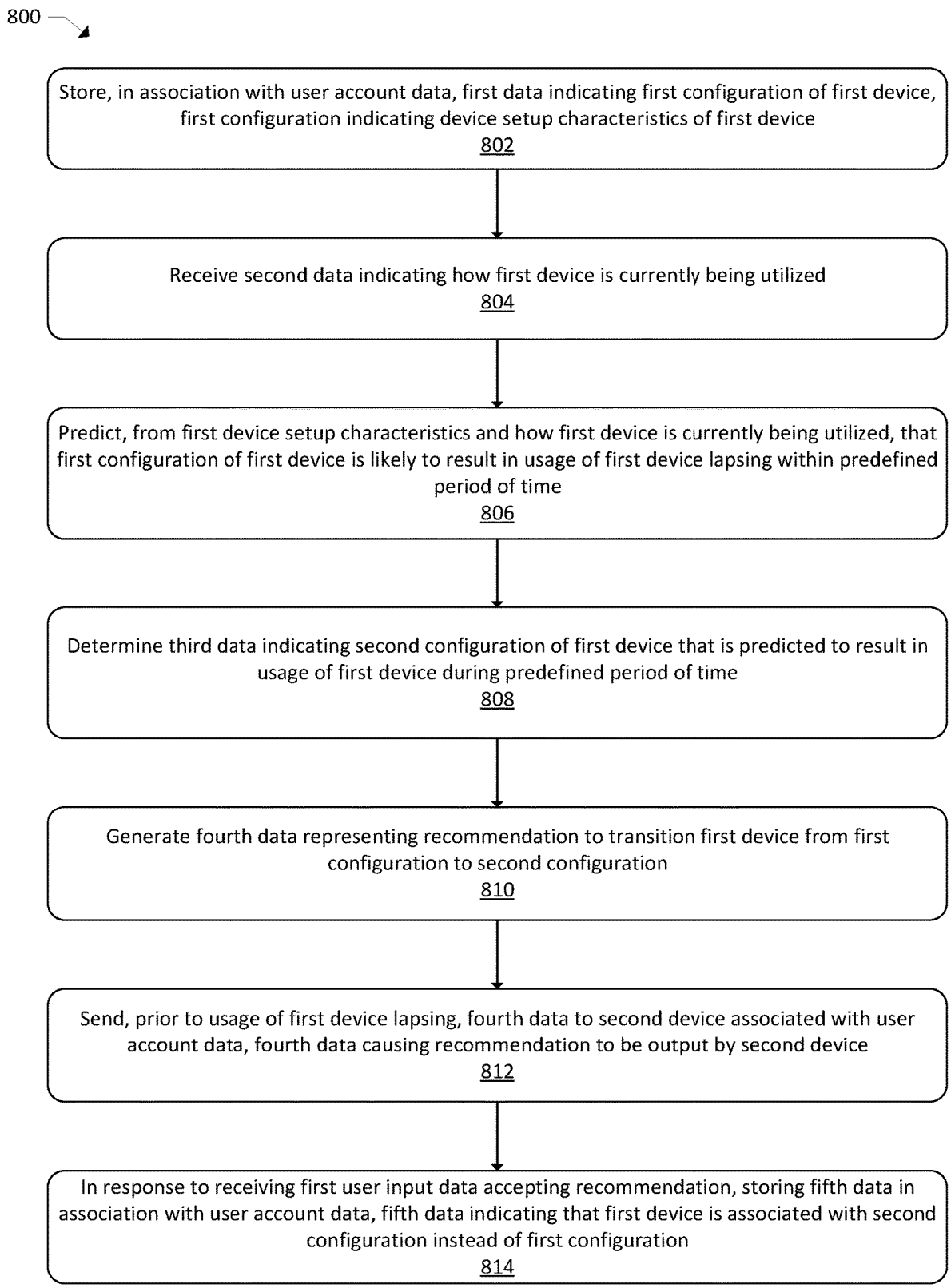
FIG. 8 illustrates a flow diagram of an example process for device configuration usage optimization.
Figure 9:
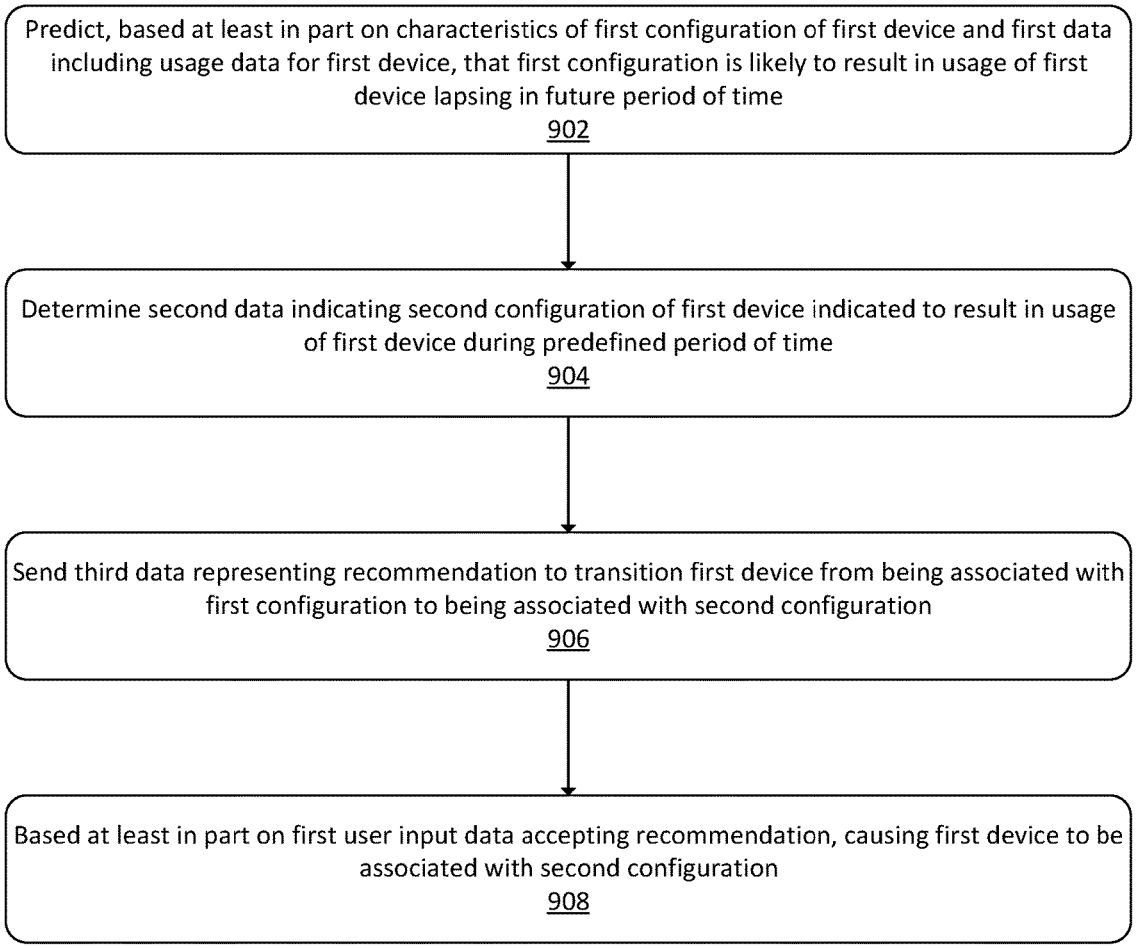
FIG. 9 illustrates a flow diagram of another example process for device configuration usage optimization.

FIGS. 8 and 9 illustrates processes for device configuration usage optimization. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7 and 10-12, although the processes may be implemented in a wide variety of other environments, architectures and systems.

FIG. 8 illustrates a flow diagram of an example process 800 for device configuration usage optimization. The order in which the operations or steps are described is not intended to be construed as a limitation, and any number of the described operations may be combined in any order and/or in parallel to implement process 800.

At block 802, the process 800 may include storing, in association with user account data, first data indicating a first configuration of a first device, the first configuration indicating device configuration characteristics of the first device. For example, the first configuration of the first device may indicate a device type of the device, a naming indicator of the device, a location of the device such as within an environment, device grouping information for the device, device associations with other devices, etc.

At block 804, the process 800 may include receiving second data indicating how the first device is currently being utilized. For example, this device usage data may include data such as usage counts indicating how many times a device has been used within a given period of time as well as timing data indicating whether the device was used may be acquired by the input component.

At block 806, the process 800 may include predicting, from the first device setup characteristics and how the first device is currently being utilized, that the first configuration of the first device is likely to result in usage of the first device lapsing within a predefined period of time. For example, some or all of the data described above may be received by an input component, which may format the data for input to a lapse inference component. The lapse inference component may be configured to receive the input data from the input component and may determine a likelihood that a current configuration of a or a set of devices is likely to lead to device usage cessation. To do so, the lapse inference component may utilize, in addition to the input data, lapse training data that indicates prior device configurations that were associated with device usage cessation. A training component may be utilized to acquire the lapse training data and to train the lapse inference component. For example, the input data, for a given device configuration may indicate that a given device has a device type of a smart plug and that the device has a naming indicator of "Christmas Tree." The input data may also indicate that the device usage count for the device is only two times per day, once in the morning and once in the evening. The input data may also indicate that the user account in question does not include other smart home devices, or that the user account is associated with smart home devices that also have naming indicators associated with a holiday. The lapse inference component may be configured to intake this data and to determine there is a high likelihood that use of the device in question will cease following a holiday season. In examples, the lapse inference component may utilize a model, such as a machine learning model, to make the device lapse determinations described herein. In these examples, the machine learning model may be trained utilizing the lapse training data such that factors associated with the input data are identified and utilized to more accurately determine a likelihood of device usage cessation for given device configurations.

At block 808, the process 800 may include determining third data indicating a second configuration of the first device that is predicted to result in the usage of the first device during the predefined period of time. For example, when the lapse inference component determines that the likelihood of device usage cessation satisfies a threshold likelihood value, the lapse inference component may send an indication of the likely device usage cessation to a configuration determination component. The configuration determination component may be utilized to identify one or more alternative configurations for the device that may be associated with a decreased likelihood of device usage cessation. To do so, the configuration determination component may utilize, as input, device grouping data, user account data, prior engagement data, prior lapse data, and/or other data types identified as being associated with determining alternative device configurations. For example, the device grouping data may indicate if the device(s) in question are associated with a device group, what other smart home devices are associated with the user account at issue, and/or the characteristics of other devices associated with the user account at issue. Additionally, the user account data may indicate individual user profiles associated with the user account and characteristics of how those user profiles utilize devices. The prior engagement data may indicate a degree of engagement by users of the user account with one or more voice interface devices, smart home devices, and/or a companion application associated with voice interface devices. The prior lapse data may indicate one or more prior determinations of device usage cessation associated with the same device that is at issue and/or other devices. Utilizing some or all of the data described above, the configuration determination component may determine one or more alternative configurations to recommend to the user for the device(s) in question. In some examples, the configuration determination component may utilize a model to make device configuration determinations. In these examples the model may be a machine learning model that may be trained by the training component utilizing configuration training data that indicates alternative device configurations and device usage outcomes when device configurations are transitioned to the alternative device configurations. Utilizing the example above of a smart plug with the naming indicator of Christmas Light, the configuration determination component may determine that the user account is also associated with a voice interface device with a naming indicator of "Living Room," and that a smart television also associated with the Living Room is interacted with most evenings.

Using at least this data, the configuration determination component may determine that an alternative device configuration for the smart plug is to transition the device to the living room of the environment in question and for the user to plug a lamp or other light emitting device into the smart plug such that the light emitting device can be controlled utilizing the voice interface device that is located in the same room. In this example, the smart plug is utilized for the same purpose (e.g., to turn on lights), but is reconfigured to control a different set of lights. In other examples, the device reconfiguration may be to associate the device in question with a different purpose. For example, a voice interface device may transition from being utilized to receive speech input to being utilized as a motion detector, a smart plug may be transitioned from being utilized to control lights to being utilized to control an appliance, a smart speaker may be transitioned from being utilized to output responses to speech input to being utilized as one of several speakers in a surround sound system and/or a whole home audio experience, etc.

At block 810, the process 800 may include generating fourth data representing a recommendation to transition the first device from the first configuration to the second configuration. For example, utilizing the determinations described above, a recommendation component may be configured to generate and send one or more recommendations to change the device configurations, to change the device functionality, and/or to acquire additional devices. The recommendation component may be configured to determine what type of recommendation to generate and when and how to send that recommendation. For example, the recommendation component may query the user account data at issue to determine user preference data and/or device capability data for devices that may receive the recommendation. The user preference data may indicate user preferences for how the system communicates with users, including for purposes of providing recommendations. The device capability data may indicate whether devices associated with the user account data include speakers, screens, and/or other modalities for outputting the recommendations. Utilizing this data, the recommendation component may format the recommendation to be output by selected device(s) associated with the user account data. Additionally, in examples, determining when to output the recommendation and/or a notification of the recommendation may be determined by the recommendation component. For example, one or more environmental conditions and/or timing conditions may be identified by the recommendation component. Example environmental conditions may include detection of user presence in the environment, detection of certain device states for devices in the environment, detection of certain user interactions such as a user providing speech input to a voice interface device, etc. Example timing conditions may include predefined times and/or ranges of times during a day, predefined days, etc. The recommendation component may determine when the one or more environmental conditions and the one or more timing conditions are satisfied and may send the recommendation and/or a notification of the recommendation to one or more devices associated with the user account data.

At block 812, the process 800 may include sending, prior to the usage of the first device lapsing, the fourth data to a second device associated with the user account data, the fourth data causing the recommendation to be output by the second device. In this example, the second device may be a selected device to receive the recommendation based at least in part on device capabilities, user preferences, proximity of the second device to the first device, association of the second device with a given user, etc.

At block 814, the process 800 may include, in response to receiving first user input data accepting the recommendation, storing fifth data in association with the user account data, the fifth data indicating that first device is associated with the second configuration instead of the first configuration. For example, acceptance of the recommendation may cause a configuration component to perform operations associated with reconfiguring the device(s) based at least in part on the recommendation. For example, the configuration component may associate the recommended configuration of the device(s) with the device(s) in the user account data. This may include changing a device type indicator for the device(s), changing a naming indicator of the device(s), changing a location indicator of the device(s), changing device grouping of the device(s), etc. Additionally, when functionality enablement is recommended, the configuration component may cause one or more functionalities associated with the device(s) to be enabled for use by the device(s). Furthermore, when device acquisition is recommended, the configuration component may facilitate acquisition of the recommended device(s).

Additionally, or alternatively, the process 800 may include determining a device type associated with the first device and determining a naming indicator associated with the first device. The process 800 may also include generating the first data utilizing the device type and the naming indicator. The process 800 may also include determining, from the second data, a device usage count for the first device and determining, from the second data, a time of day that the first device has been used. The process 800 may also include generating fifth data indicating association of the user account data with voice-controllable devices other than the first device. In these examples, determining that the first configuration will result in the usage of the first device ceasing within the predefined period of time may be performed utilizing: the first data indicating the device type and the naming indicator; the device usage count; the time of day; and the fifth data.

Additionally, or alternatively, the process 800 may include receiving audio data representing speech input provided to the second device. The process 800 may also include determining an action to perform utilizing the audio data. The process 800 may also include determining, from second user input data, that the action was an unpreferred action. The process 800 may also include generating fifth data indicating unpreferred actions performed by the second device in association with the user account data, the fifth data including an indicator of the action being the unpreferred action. In these examples, determining that the first configuration will result in the usage of the first device ceasing within the predefined period of time may be performed utilizing the fifth data. By way of example, an unpreferred action may be determined from negative user interaction data generated by the system. For example, users may interact with given smart home devices over time. Some of those devices may be voice interface devices configured to capture speech input and to perform actions responsive to the speech input, such as turning on a smart light when speech input requests that the smart light be turned on. In an optimal scenario, the speech input is provided and the speech processing system associated with the voice interface device correctly identifies the action to be performed from the speech input. However, in some examples, the speech processing system may not properly identify the action, may identify the wrong action, may not recognize the speech input, may include detection of processing errors, and/or any other scenario that may lead to a negative user interaction. Data indicating these negative user interactions may be generated and stored in association with the user account data, and this negative user interaction data may be formatted as input to the lapse inference component.

Additionally, or alternatively, the process 800 may include determining, from the user account data, a first functionality of the first device that has been enabled. The process 800 may also include determining that a second functionality of the first device is disabled. The process 800 may also include determining that the second functionality is associated with the second configuration of the first device, wherein the recommendation includes an indicator of the second functionality available to be enabled. The process 800 may also include, in response to receiving the first user input data accepting the recommendation, causing the second functionality to be enabled in association with the user account data.

FIG. 9 illustrates a flow diagram of another example process for device configuration usage optimization. The order in which the operations or steps are described is not intended to be construed as a limitation, and any number of the described operations may be combined in any order and/or in parallel to implement process 900.

At block 902, the process 900 may include predicting, based at least in part on characteristics of a first configuration of a first device and first data including usage data for the first device, that the first configuration is likely to result in usage of the first device lapsing in a future period of time. For example, some or all of the data described above may be received by an input component, which may format the data for input to a lapse inference component. The lapse inference component may be configured to receive the input data from the input component and may determine a likelihood that a current configuration of a or a set of devices is likely to lead to device usage cessation. To do so, the lapse inference component may utilize, in addition to the input data, lapse training data that indicates prior device configurations that were associated with device usage cessation. A training component may be utilized to acquire the lapse training data and to train the lapse inference component. For example, the input data, for a given device configuration may indicate that a given device has a device type of a smart plug and that the device has a naming indicator of "Christmas Tree." The input data may also indicate that the device usage count for the device is only two times per day, once in the morning and once in the evening. The input data may also indicate that the user account in question does not include other smart home devices, or that the user account is associated with smart home devices that also have naming indicators associated with a holiday. The lapse inference component may be configured to intake this data and to determine there is a high likelihood that use of the device in question will cease following a holiday season. In examples, the lapse inference component may utilize a model, such as a machine learning model, to make the device lapse determinations described herein. In these examples, the machine learning model may be trained utilizing the lapse training data such that factors associated with the input data are identified and utilized to more accurately determine a likelihood of device usage cessation for given device configurations.

At block 904, the process 900 may include determining second data indicating a second configuration of the first device indicated to result in the usage of the first device during the predefined period of time. For example, when the lapse inference component determines that the likelihood of device usage cessation satisfies a threshold likelihood value, the lapse inference component may send an indication of the likely device usage cessation to a configuration determination component. The configuration determination component may be utilized to identify one or more alternative configurations for the device that may be associated with a decreased likelihood of device usage cessation. To do so, the configuration determination component may utilize, as input, device grouping data, user account data, prior engagement data, prior lapse data, and/or other data types identified as being associated with determining alternative device configurations. For example, the device grouping data may indicate if the device(s) in question are associated with a device group, what other smart home devices are associated with the user account at issue, and/or the characteristics of other devices associated with the user account at issue. Additionally, the user account data may indicate individual user profiles associated with the user account and characteristics of how those user profiles utilize devices. The prior engagement data may indicate a degree of engagement by users of the user account with one or more voice interface devices, smart home devices, and/or a companion application associated with voice interface devices. The prior lapse data may indicate one or more prior determinations of device usage cessation associated with the same device that is at issue and/or other devices. Utilizing some or all of the data described above, the configuration determination component may determine one or more alternative configurations to recommend to the user for the device(s) in question. In some examples, the configuration determination component may utilize a model to make device configuration determinations. In these examples the model may be a machine learning model that may be trained by the training component utilizing configuration training data that indicates alternative device configurations and device usage outcomes when device configurations are transitioned to the alternative device configurations. Utilizing the example above of a smart plug with the naming indicator of Christmas Light, the configuration determination component may determine that the user account is also associated with a voice interface device with a naming indicator of "Living Room," and that a smart television also associated with the Living Room is interacted with most evenings.

Using at least this data, the configuration determination component may determine that an alternative device configuration for the smart plug is to transition the device to the living room of the environment in question and for the user to plug a lamp or other light emitting device into the smart plug such that the light emitting device can be controlled utilizing the voice interface device that is located in the same room. In this example, the smart plug is utilized for the same purpose (e.g., to turn on lights), but is reconfigured to control a different set of lights. In other examples, the device reconfiguration may be to associate the device in question with a different purpose. For example, a voice interface device may transition from being utilized to receive speech input to being utilized as a motion detector, a smart plug may be transitioned from being utilized to control lights to being utilized to control an appliance, a smart speaker may be transitioned from being utilized to output responses to speech input to being utilized as one of several speakers in a surround sound system and/or a whole home audio experience, etc.

At block 906, the process 900 may include sending third data representing a recommendation to transition the first device from being associated with the first configuration to being associated with the second configuration. For example, utilizing the determinations described above, a recommendation component may be configured to generate and send one or more recommendations to change the device configurations, to change the device functionality, and/or to acquire additional devices. The recommendation component may be configured to determine what type of recommendation to generate and when and how to send that recommendation. For example, the recommendation component may query the user account data at issue to determine user preference data and/or device capability data for devices that may receive the recommendation. The user preference data may indicate user preferences for how the system communicates with users, including for purposes of providing recommendations. The device capability data may indicate whether devices associated with the user account data include speakers, screens, and/or other modalities for outputting the recommendations. Utilizing this data, the recommendation component may format the recommendation to be output by selected device(s) associated with the user account data. Additionally, in examples, determining when to output the recommendation and/or a notification of the recommendation may be determined by the recommendation component. For example, one or more environmental conditions and/or timing conditions may be identified by the recommendation component. Example environmental conditions may include detection of user presence in the environment, detection of certain device states for devices in the environment, detection of certain user interactions such as a user providing speech input to a voice interface device, etc. Example timing conditions may include predefined times and/or ranges of times during a day, predefined days, etc. The recommendation component may determine when the one or more environmental conditions and the one or more timing conditions are satisfied and may send the recommendation and/or a notification of the recommendation to one or more devices associated with the user account data.

At block 908, the process 900 may include, based at least in part on first user input data accepting the recommendation, causing the first device to be associated with the second configuration. For example, acceptance of the recommendation may cause a configuration component to perform operations associated with reconfiguring the device(s) based at least in part on the recommendation. For example, the configuration component may associate the recommended configuration of the device(s) with the device(s) in the user account data. This may include changing a device type indicator for the device(s), changing a naming indicator of the device(s), changing a location indicator of the device(s), changing device grouping of the device(s), etc. Additionally, when functionality enablement is recommended, the configuration component may cause one or more functionalities associated with the device(s) to be enabled for use by the device(s). Furthermore, when device acquisition is recommended, the configuration component may facilitate acquisition of the recommended device(s).

Additionally, or alternatively, the process 900 may include determining the characteristics based at least in part on a device type of the first device and a naming indicator of the first device. The process 900 may also include determining how the first device is being utilized from a device usage count for the first device and a time of day that the first device has been used. In these examples, determining that the first configuration will result in the usage of the first device ceasing may be based at least in part on the device type, the naming indicator, the device usage count, and the time of day.

Additionally, or alternatively, the process 900 may include determining, from second user input data, fourth data indicating a number of unpreferred actions taken in response to speech input received by at least one of the first device or a second device associated with the first device. In these examples, determining that the first configuration will result in the usage of the first device ceasing may be based at least in part on the fourth data.

Additionally, or alternatively, the process 900 may include determining a functionality that is currently disabled in associated with the first device. The process 900 may also include determining that the functionality is associated with the second configuration of the first device, wherein the recommendation includes an indicator of the second functionality. The process 900 may also include, based at least in part on the first user input data, causing the second functionality to be enabled in association with the first device.

Additionally, or alternatively, the process 900 may include receiving audio data representing speech input received at the first device or a second device. The process 900 may also include determining, from fourth data indicating a context associated with the speech input, that the speech input is associated with the second configuration. The process 900 may also include causing the recommendation to be output with a response to the speech input based at least in part on the speech input being associated with the second configuration.

Additionally, or alternatively, the process 900 may include determining a third configuration of the device indicated to result in the usage of the first device during the predefined period of time. The process 900 may also include determining that the third configuration differs at least to a threshold degree from the second configuration. In these examples, the recommendation may indicate configuration options including the second configuration and the third configuration based at least in part on the third configuration differing at least to the threshold degree from the second configuration.

Additionally, or alternatively, the process 900 may include determining, based at least in part on the second configuration: a naming identifier to associate with the first device, the naming identifier differing from a previous naming identifier associated with the first device when the first device was in the first configuration; and a device type to associate with the first device, the device type differing from a previous device type associated with the first device when the first device was in the first configuration. In these examples, causing the first device to be associated with the second configuration may include causing user account data to indicate that the first device is associated with the naming identifier and the device type.

Additionally, or alternatively, the process 900 may include determining that a functionality associated with the first device when in the second configuration is associated with a second device. The process 900 may also include determining, from user account data associated with the first device, that that user account data indicates an absence of the second device, wherein the recommendation includes an indicator that the second device is recommended to be acquired to perform the functionality. The process 900 may also include causing a purchase of the second device to be performed based at least in part on the first user input data accepting the recommendation.

Additionally, or alternatively, the process 900 may include determining, based at least in part on user account data, a user classification indicating attributes of prior device usage. In these examples, selecting the second configuration of the first device may be based at least in part on the user classification.

Figure 10:
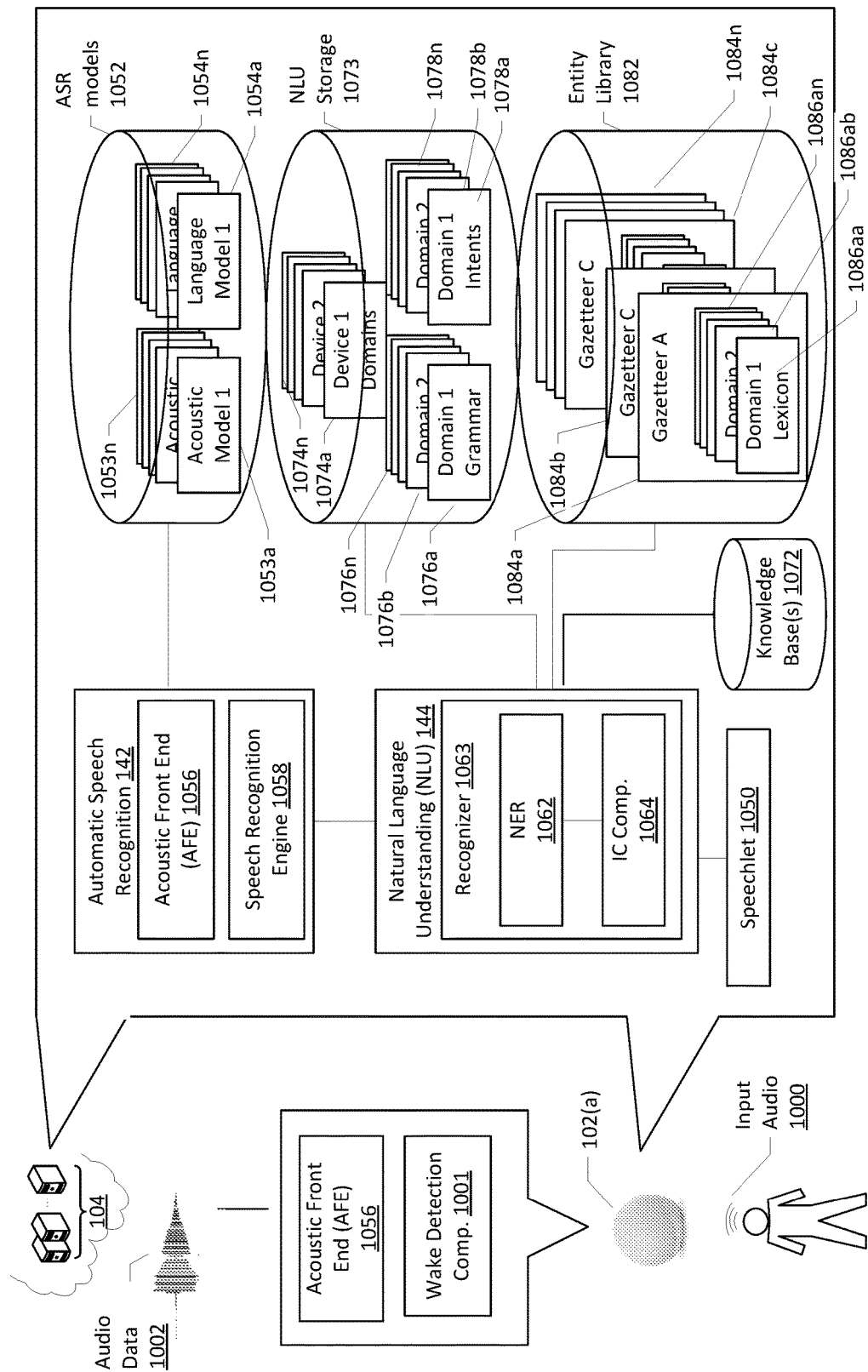
FIG. 10 illustrates a conceptual diagram of components of a speech-processing system for processing audio data provided by one or more devices.

FIG. 10 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 10 may occur directly or across a network 106. An audio capture component, such as a microphone 114 of the device 102(*a*), or another device, captures audio 1000 corresponding to a spoken utterance. The device 102(*a*), using a wake word engine 1001, then processes audio data corresponding to the audio 1000 to determine if a keyword (such as a wakeword) is detected in the audio data. Following detection of a wakeword, the device 102(*a*) processes audio data 1002 corresponding to the utterance utilizing an ASR component 142. The audio data 1002 may be output from an optional acoustic front end (AFE) 1056 located on the device prior to transmission. In other instances, the audio data 1002 may be in a different form for processing by a remote AFE 1056, such as the AFE 1056 located with the ASR component 142.

The wake word engine 1001 works in conjunction with other components of the user device, for example a microphone to detect keywords in audio 1000. For example, the device may convert audio 1000 into audio data, and process the audio data with the wake word engine 1001 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 1001 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 1001 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102(*a*) may "wake." The audio data 1002 may include data corresponding to the wakeword. Further, a local device may "wake" upon detection of speech/spoken audio above a threshold, as described herein. An ASR component 142 may convert the audio data 1002 into text. The ASR transcribes audio data into text data representing the words of the speech contained in the audio data 1002. The text data may then be used by other components for various purposes, such as executing system commands, inputting data, etc. A spoken utterance in the audio data is input to a processor configured to perform ASR which then interprets the utterance based on the similarity between the utterance and pre-established language models 1054 stored in an ASR model knowledge base (ASR Models Storage 1052). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1053 stored in an ASR Models Storage 1052), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 142 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1056 and a speech recognition engine 1058. The acoustic front end (AFE) 1056 transforms the audio data from the microphone into data for processing by the speech recognition engine 1058. The speech recognition engine 1058 compares the speech recognition data with acoustic models 1053, language models 1054, and other data models and information for recognizing the speech conveyed in the audio data. The AFE 1056 may reduce noise in the audio data and divide the digitized audio data into frames representing time intervals for which the AFE 1056 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1058 may process the output from the AFE 1056 with reference to information stored in speech/model storage (1052). Alternatively, post front-end processed data (such as feature vectors) may be received by the device executing ASR processing from another source besides the internal AFE. For example, the user device may process audio data into feature vectors (for example using an on-device AFE 1056).

The speech recognition engine 1058 attempts to match received feature vectors to language phonemes and words as known in the stored acoustic models 1053 and language models 1054. The speech recognition engine 1058 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, turn on Light A" The wake detection component may identify the wake word, otherwise described as a trigger expression, "Alexa," in the user utterance and may "wake" based on identifying the wake word. The speech recognition engine 1058 may identify, determine, and/or generate text data corresponding to the user utterance, here "turn on Light A."

The speech recognition engine 1058 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1058 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 144 may include various components, including potentially dedicated processor(s), memory, storage, etc. As shown in FIG. 10, an NLU component 144 may include a recognizer 1063 that includes a named entity recognition (NER) component 1062 which is used to identify portions of query text that correspond to a named entity that may be recognizable by the system. A downstream process called named entity resolution links a text portion to a specific entity known to the system. To perform named entity resolution, the system may utilize gazetteer information (1084a-1084n) stored in entity library storage 1082. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 140 based on the utterance input audio 1000) and attempts to make a semantic interpretation of the text. That is, the NLU process determines the meaning behind the text based on the individual words and then implements that meaning. NLU processing 144 interprets a text string to derive an intent or a desired action from the user as well as the pertinent pieces of information in the text that allow a device (e.g., device 102(a)) to complete that action. For example, if a spoken utterance is processed using ASR 142 and outputs the text "turn on Light A" the NLU process may determine that the user intended to cause a device state of a device named Light A.

The NLU 144 may process several textual inputs related to the same utterance. For example, if the ASR 142 outputs N text segments (as part of an N-best list), the NLU may process all N outputs to obtain NLU results.

As will be discussed further below, the NLU process may be configured to parse and tag to annotate text as part of NLU processing. For example, for the text "turn on Light A," "turn on" may be tagged as a command (to perform device state transition).

To correctly perform NLU processing of speech input, an NLU process 144 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1062 receives a query in the form of ASR results and attempts to identify relevant grammars and lexical information that may be used to construe meaning. To do so, the NLU component 144 may begin by identifying potential domains that may relate to the received query. The NLU storage 1073 includes a database of devices (1074a-1074n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 1063, language model and/or grammar database (1076a-1076n), a particular set of intents/actions (1078a-1078n), and a particular personalized lexicon (1086). Each gazetteer (1084a-1084n) may include domain-indexed lexical information associated with a particular user and/or device. For example, the Gazetteer A (1084a) includes domain-index lexical information 1086aa to 1086an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1064 parses the query to determine an intent or intents for each identified domain, where the intent corresponds to the action to be performed that is responsive to the query. Each domain is associated with a database (1078a-1078n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1064 identifies potential intents for each identified domain by comparing words in the query to the words and phrases in the intents database 1078. In some instances, the determination of an intent by the IC component 1064 is performed using a set of rules or templates that are processed against the incoming text to identify a matching intent.

In order to generate a particular interpreted response, the NER 1062 applies the grammar models and lexical information associated with the respective domain to actually recognize a mention of one or more entities in the text of the query. In this manner, the NER 1062 identifies "slots" or values (i.e., particular words in query text) that may be needed for later command processing. Depending on the complexity of the NER 1062, it may also label each slot with a type of varying levels of specificity (such as noun, place, device name, device location, city, artist name, song name, amount of time, timer number, or the like). Each grammar model 1076 includes the names of entities (i.e., nouns) commonly found in speech about the particular domain (i.e., generic terms), whereas the lexical information 1086 from the gazetteer 1084 is personalized to the user(s) and/or the device. For instance, a grammar model associated with the shopping domain may include a database of words commonly used when people discuss shopping.

The intents identified by the IC component 1064 are linked to domain-specific grammar frameworks (included in 1076) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (1076) framework or frameworks may correspond to sentence structures such as "purchase item called 'Item A' from Marketplace A."

For example, the NER component 1062 may parse the query to identify words as subject, object, verb, preposition, etc., based on grammar rules and/or models, prior to recognizing named entities. The identified verb may be used by the IC component 1064 to identify intent, which is then used by the NER component 1062 to identify frameworks. A framework for the intent of "play a song," meanwhile, may specify a list of slots/fields applicable to play the identified "song" and any object modifier (e.g., specifying a music collection from which the song should be accessed) or the like. The NER component 1062 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1062 may search the database of generic words associated with the domain (in the knowledge base 1072). So, for instance, if the query was "identify this song," after failing to determine which song is currently being output, the NER component 1062 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 1050. The destination speechlet 1050 may be determined based on the NLU output. For example, if the NLU output includes a command to send a message, the destination speechlet 1050 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the speechlet 1050 may provide some or all of this information to a text-to-speech (TTS) engine. The TTS engine may then generate an actual audio file for outputting the audio data determined by the application (e.g., "okay," or "Light A on").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 144 during runtime operations where NLU operations are performed on text (such as text output from an ASR component 142). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1063. Each recognizer may include various NLU components such as an NER component 1062, IC component 1064 and other components such as an entity resolver, or other components.

For example, a messaging domain recognizer 1063-A (Domain A) may have an NER component 1062-A that identifies what slots (i.e., portions of input text) may correspond to particular words relevant to that domain. The words may correspond to entities such as (for the messaging domain) a recipient. An NER component 1062 may use a machine learning model, such as a domain specific conditional random field (CRF) to both identify the portions corresponding to an entity as well as identify what type of entity corresponds to the text portion. The messaging domain recognizer 1063-A may also have its own intent classification (IC) component 1064-A that determines the intent of the text assuming that the text is within the proscribed domain. An IC component may use a model, such as a domain specific maximum entropy classifier to identify the intent of the text, where the intent is the action the user desires the system to perform. For this purpose, device 102(*a*) may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 104, as illustrated herein are exemplary, and may be located in a stand-alone device or may be included, in whole or in part, as a component of a larger device or system, may be distributed across a network or multiple devices connected by a network, etc.

Figure 11:
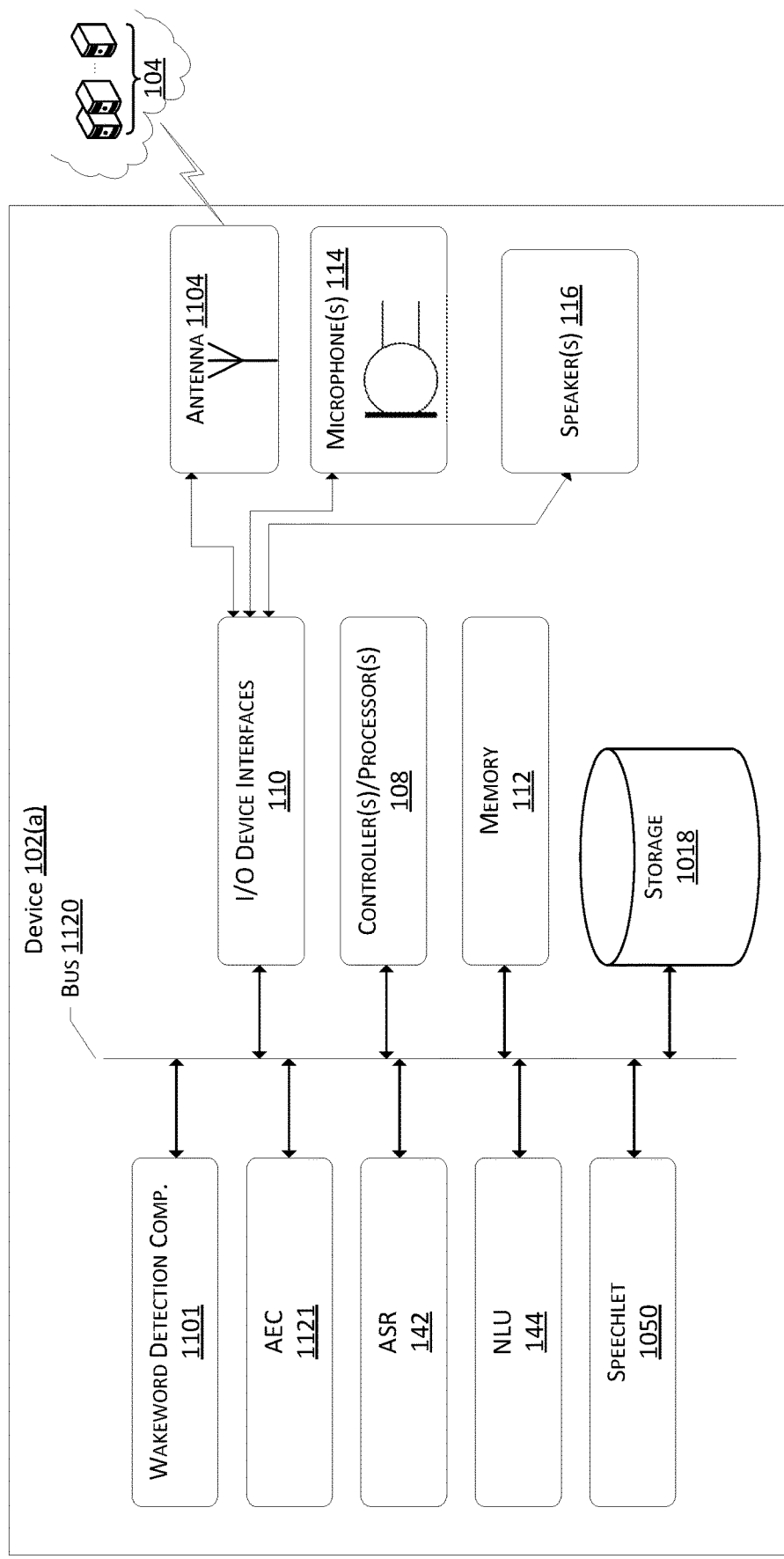
FIG. 11 illustrates a conceptual diagram of components of an example device that may utilized in association with device configuration usage optimization.

FIG. 11 illustrates a conceptual diagram of components of an example connected device from which sensor data may be received for device functionality control utilizing activity prediction. For example, the device may include one or more electronic devices such as voice interface devices (e.g., smart speaker devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home associated with the first user profile, in a place a business, healthcare facility (e.g., hospital, doctor's office, pharmacy, etc.), in vehicle (e.g., airplane, truck, car, bus, etc.) in a public forum (e.g., shopping center, store, etc.), for example. A second user profile may also be associated with one or more other electronic devices, which may be situated in home or other place associated with the second user profile, for example. The device 102(*a*) may be implemented as a standalone device that is relatively simple in terms of functional capabilities with limited input/output components, memory, and processing capabilities. For instance, the device 102(*a*) may not have a keyboard, keypad, touchscreen, or other form of mechanical input. In some instances, the device 102(*a*) may include a microphone 114, a power source, and functionality for sending generated audio data via one or more antennas 1104 to another device and/or system.

The device 102(*a*) may also be implemented as a more sophisticated computing device, such as a computing device similar to, or the same as, a smart phone or personal digital assistant. The device 102(*a*) may include a display with a touch interface and various buttons for providing input as well as additional functionality such as the ability to send and receive communications. Alternative implementations of the device 102(*a*) may also include configurations as a personal computer. The personal computer may include input devices such as a keyboard, a mouse, a touchscreen, and other hardware or functionality that is found on a desktop, notebook, netbook, or other personal computing devices. In examples, the device 102(*a*) may include an automobile, such as a car. In other examples, the device 102(*a*) may include a pin on a user's clothes or a phone on a user's person. In examples, the device 102(*a*) and may not include speaker(s) and may utilize speaker(s) of an external or peripheral device to output audio via the speaker(s) of the external/peripheral device. In this example, the device 102(*a*) might represent a set-top box (STB), and the device 102(*a*) may utilize speaker(s) of another device such as a television that is connected to the STB for output of audio via the external speakers. In other examples, the device 102(*a*) may not include the microphone(s) 114, and instead, the device 102(*a*) can utilize microphone(s) of an external or peripheral device to capture audio and/or generate audio data. In this example, the device 102(*a*) may utilize microphone(s) of a headset that is coupled (wired or wirelessly) to the device 102(*a*). These types of devices are provided by way of example and are not intended to be limiting, as the techniques described in this disclosure may be used in essentially any device that has an ability to recognize speech input or other types of natural language input.

The device 102(*a*) of FIG. 11 may include one or more controllers/processors 108, that may include a central processing unit (CPU) for processing data and computer-readable instructions, and memory 112 for storing data and instructions of the device 102(*a*). In examples, the skills and/or applications described herein may be stored in association with the memory 112, which may be queried for content and/or responses as described herein. The device 102(*a*) may also be connected to removable or external non-volatile memory and/or storage, such as a removable memory card, memory key drive, networked storage, etc., through input/output device interfaces 110.

Computer instructions for operating the device 102(*a*) and its various components may be executed by the device's controller(s)/processor(s) 108, using the memory 112 as "working" storage at runtime. A device's computer instructions may be stored in a non-transitory manner in non-volatile memory 112, storage 1118, or an external device(s). Alternatively, some or all of the executable instructions may be embedded in hardware or firmware on the device 102(*a*) in addition to or instead of software.

The device 102(*a*) may include input/output device interfaces 110. A variety of components may be connected through the input/output device interfaces 110. Additionally, the device 102(*a*) may include an address/data bus 1120 for conveying data among components of the respective device. Each component within a device 102(*a*) may also be directly connected to other components in addition to, or instead of, being connected to other components across the bus 1120.

The device 102(*a*) may include a display, which may comprise a touch interface. Any suitable display technology, such as liquid crystal display (LCD), organic light emitting diode (OLED), electrophoretic, and so on, may be utilized for the displays. Furthermore, the processor(s) 108 may comprise graphics processors for driving animation and video output on the associated display. As a way of indicating to a user that a connection between another device has been opened, the device 102(*a*) may be configured with one or more visual indicators, such as the light element(s), which may be in the form of LED(s) or similar components (not illustrated), that may change color, flash, or otherwise provide visible light output, such as for a notification indicator on the device 102(*a*). The input/output device interfaces 110 that connect to a variety of components. This wired or a wireless audio and/or video port may allow for input/output of audio/video to/from the device 102(*a*). The device 102(*a*) may also include an audio capture component. The audio capture component may be, for example, a microphone 114 or array of microphones, a wired headset or a wireless headset, etc. The microphone 114 may be configured to capture audio. If an array of microphones is included, approximate distance to a sound's point of origin may be determined using acoustic localization based on time and amplitude differences between sounds captured by different microphones of the array. The device 102(a) (using microphone 114, wakeword detection component 1001, ASR component 142, etc.) may be configured to generate audio data corresponding to captured audio. The device 102(a) (using input/output device interfaces 110, antenna 1104, etc.) may also be configured to transmit the audio data to the remote system 104 for further processing or to process the data using internal components such as a wakeword detection component 1001.

Via the antenna(s) 1104, the input/output device interface 110 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102(a) via wired connection to an external alternating current (AC) outlet, and/or via onboard power sources, such as batteries, solar panels, etc.

Through the network(s), the system may be distributed across a networked environment. Accordingly, the device 102(a) and/or the system 104 may include an ASR component 142. The ASR component 142 of device 102(a) may be of limited or extended capabilities. The ASR component 142 may include language models stored in ASR model storage component, and an ASR component 142 that performs automatic speech recognition. If limited speech recognition is included, the ASR component 142 may be configured to identify a limited number of words, such as keywords detected by the device, whereas extended speech recognition may be configured to recognize a much larger range of words.

The device 102(a) and/or the system 104 may include a limited or extended NLU component 144. The NLU component 144 of device 102(a) may be of limited or extended capabilities. The NLU component 144 may comprise a name entity recognition module, an intent classification module and/or other components. The NLU component 144 may also include a stored knowledge base and/or entity library, or those storages may be separately located.

In examples, AEC may also be performed by the device 102(a). In these examples, the operations may include causing the AEC component 1121 to be enabled or otherwise turned on, or the operations may include causing the AEC component 1121 to transition from a first mode to a second mode representing a higher sensitivity to audio data generated by the microphone 114. The AEC component 1121 may utilize the audio data generated by the microphone 114 to determine if an audio fingerprint of the audio data, or portion thereof, corresponds to a reference audio fingerprint associated with the predefined event.

The device 102(a) and/or the system 104 may also include a speechlet 1050 that is configured to execute commands/ functions associated with a spoken command as described herein. The device 102(a) may include a wakeword detection component 1001, which may be a separate component or may be included in an ASR component 142. The wakeword detection component 1001 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102(a) may be configured collectively to identify a set of the directional audio signals in which the wake expression is detected or in which the wake expression is likely to have occurred.

Figure 12:
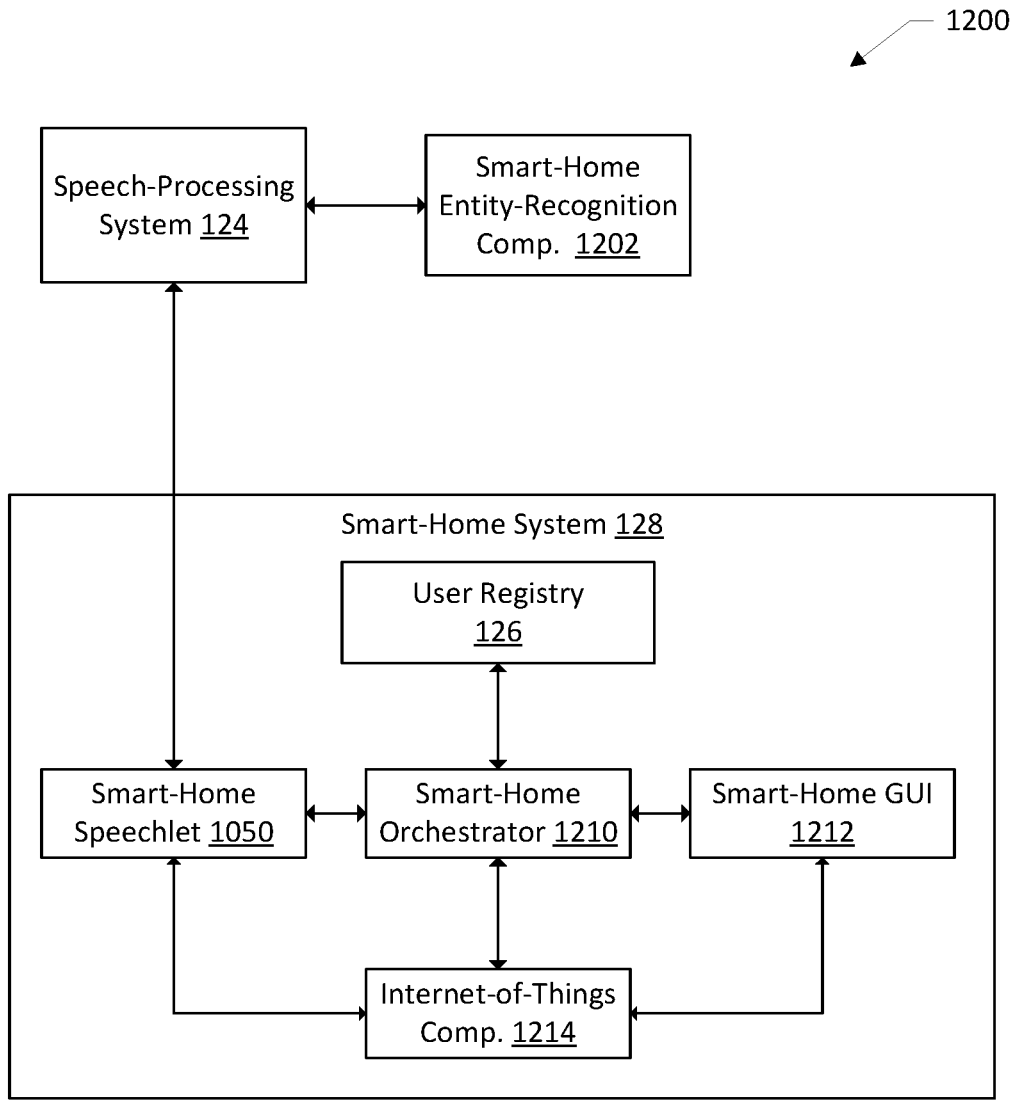
FIG. 12 illustrates a conceptual diagram of components utilized in an example smart home system.

FIG. 12 illustrates a conceptual diagram of example components of a smart-home system that may be utilized for device functionality identification. The smart-home system 128 may include components described above with respect to FIG. 1. The smart-home system 128 may also be configured to send data to and receive data from other components of a system and/or one or more other systems. For example, the other components may include a speech processing system 124. The smart-home system 128 may also include components such as a smart-home orchestrator 1210, a smart-home graphical user interface (GUI) 1212, and/or an internet-of-things component 1214. Each of these components will be described in detail below.

As described herein, a user may interact with a smart device using tactile input to the smart device, voice input to a voice-controlled device, and/or input to an application residing on and/or accessible to a personal device. When a user interacts with a smart device using voice input to a voice-controlled device, audio data representing user utterances may be received at the speech processing system 124. The speech processing system 124 may analyze the audio data and/or corresponding text data generated, by way of example, using an ASR component, to determine that the user utterance represents an intent to control a smart device. To determine the intent associated with the user utterance, the speech processing system 124 may utilize a smart-home entity-recognition component 1202, which may be utilized to inform one or more intents available to the speech processing system 124 and/or to inform one or more values associated with the intents. For example, the user utterance of "turn off bedroom lights" may be analyzed by the speech processing system 124. The smart-home entity-recognition component 1202 may train or otherwise provide data to the speech processing system 124 indicating intents associated with operation of smart devices, such as "turn on," "turn off," "activate," "deactivate," "dim," "brighten," "lock," "unlock," etc. The smart-home entity-recognition component 1202 may additionally, or alternatively, provide data indicating identifiers and/or payloads associated with such intents, such as "light," "lights," "lock," "outlet," "switch," etc. It should be understood that while the smart-home entity-recognition component 1202 is depicted in FIG. 12 as being a component separate from the smart-home system 128, the smart-home entity-recognition component 1202 may be a component of the smart-home system 128.

The speech processing system 124 may be configured to determine that the intent corresponds to an operation configured to be performed by the smart-home system 128, and based at least in part on such a determination, the speech processing system 124 may provide the intent data and/or other data associated with the request to the smart-home speechlet 1050 of the smart-home system 128. The smart-home orchestrator 1210 may be configured to receive data indicating that the smart-home speechlet 1050 has been invoked to determine a directive to be performed with respect to a smart device and may query one or more other components of the smart-home system 128 to effectuate the request. For example, the smart-home orchestrator 1210 may query the internet-of-things component 1214 to identify naming indicators associated with smart devices for a particular user account. The internet-of-things component 1214 may query data store(s) and/or the user registry 146 and/or the user account for such naming indicators.

In other examples, such as when the smart-home speechlet 1050 receives a request to discover a smart device, such as from a smart-device system, the smart-home orchestrator 1210 may query one or more components of the smart-home system 128 to determine associations between smart device identifiers and user account identifiers as described herein. Additionally, or alternatively, as mentioned above, the smart devices may be operated based at least in part on input data received from an application residing on and/or accessible to a personal device, such as a mobile phone and/or computer. The smart-home GUI 1212 may be utilized to receive the input data and/or to display recommendations and/or requests to a user. For example, the smart-home GUI 1212 may be utilized to display a request to confirm that a selected smart device is the desired device to be acted upon.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
one or more processors; and
non-transitory computer-readable media storing computer-executable instructions that, when executed by the one or more processors, cause the one or more processors to perform operations comprising:
    determining characteristics of a first type of smart home device configuration for a first device based at least in part on a device type of the first device and a naming indicator of the first device;
    storing, in association with user account data, first data indicating the first type of smart home device configuration for the first device;
    receiving second data indicating how the first device is currently being utilized;
    predicting, from the device type of the first device, the naming indicator of the first device, and how the first device is currently being utilized, that the first type of smart home device configuration for the first device is likely to result in usage of the first device lapsing within a predefined period of time;
    determining third data indicating a second type of smart home device configuration for the first device that is predicted to result in the usage of the first device during the predefined period of time, wherein the first type of smart home device configuration is associated with first smart home functionality and the second type of smart home device configuration is associated with second smart home functionality that differs at least in part from the first smart home functionality;
    generating fourth data representing a recommendation to transition the first device from the first type of smart home device configuration to the second type of smart home device configuration;
    sending, prior to the usage of the first device lapsing, the fourth data to a second device associated with the user account data, the fourth data causing the recommendation to be output by the second device; and
    in response to receiving first user input data accepting the recommendation, storing fifth data in association with the user account data, the fifth data indicating that the first device is associated with the second type of smart home device configuration instead of the first type of smart home device configuration.

2. The system of claim 1, the operations further comprising:
determining, from the second data, a number of times that an action is performed by the first device in response to user input;
determining, from the second data, a time of day that the first device has been used;
generating sixth data indicating association of the user account data with voice-controllable devices other than the first device; and
wherein predicting that the first type of smart home device configuration is likely to result in the usage of the first device lapsing within the predefined period of time is performed utilizing:
    the number of times;
    the time of day; and
    the sixth data.

3. The system of claim 1, the operations further comprising:
receiving audio data representing speech input provided to the second device;
determining an action to perform utilizing the audio data;
determining, from second user input data, that the action differed from a requested action from the speech input;
generating sixth data indicating unpreferred actions performed by the second device in association with the user account data, the sixth data including an indicator of the action being the unpreferred action; and
wherein predicting that the first type of smart home device configuration is likely to result in the usage of the first device lapsing within the predefined period of time is performed utilizing the sixth data.

4. The system of claim 1, the operations further comprising:
determining, from the user account data, the first smart home functionality of the first device that has been enabled;
determining the second smart home functionality associated with the second type of smart home device configuration;
determining that the second smart home functionality of the first device has yet to be enabled;
determining, from the second smart home functionality being associated with the second type of smart home device configuration, to include an indicator of the second smart home functionality being available to be enabled in the recommendation; and in response to receiving the first user input data accepting the recommendation, causing the second smart home functionality to be enabled in association with the user account data.

5. A method, comprising:
determining characteristics of a first type of smart home device configuration for a first device based at least in part on a device type of the first device and a naming indicator of the first device;
predicting, based at least in part on the characteristics of the first type of smart home device configuration for the first device, first data including usage data for the first device, the device type of the first device, and the naming indicator of the first device, that the first type of smart home device configuration for the first device is likely to result in usage of the first device lapsing during a future period of time;
determining second data indicating a second type of smart home device configuration for the first device indicated to result in the usage of the first device during the future period of time, wherein the first type of smart home device configuration is associated with first smart home functionality and the second type of smart home device configuration is associated with second smart home functionality that differs at least in part from the first smart home functionality; and
sending third data representing a recommendation to transition the first device from being associated with the first type of smart home device configuration to being associated with the second type of smart home device configuration.

6. The method of claim 5, further comprising:
determining a number of times that an action is performed by the first device in response to user input; and
determining a time of day that the action is performed by the first device;
wherein predicting that the first type of smart home device configuration for the first device is likely to result in usage of the first device lapsing is further based at least in part on the number of times that an action is performed by the first device in response to user input and the time of day that the action is performed by the first device.

7. The method of claim 5, further comprising:
determining fourth data indicating a number of actions performed by at least one of the first device or a second device that differed from a requested action associated with speech input; and
wherein predicting that the first type of smart home device configuration is likely to result in the usage of the first device lapsing comprises predicting that the first type of smart home device configuration is likely to result in the usage of the first device lapsing based at least in part on the fourth data.

8. The method of claim 5, further comprising:
determining the second smart home functionality that is yet to be enabled in associated with the first device;
determining that the second smart home functionality is associated with the second type of smart home device configuration of the first device, wherein the recommendation includes an indicator of the second smart home functionality; and
based at least in part on user input data accepting the recommendation, causing the second smart home functionality to be enabled in association with the first device.

9. The method of claim 5, further comprising:
receiving audio data representing speech input received at the first device;
determining, from fourth data indicating a context associated with the speech input, that the speech input is associated with the second type of smart home device configuration; and
causing the recommendation to be output with a response to the speech input based at least in part on the speech input being associated with the second type of smart home device configuration.

10. The method of claim 5, further comprising:
determining fourth data indicating a third type of smart home device configuration of the first device indicated to result in the usage of the first device during the future period of time;
determining that the third type of smart home device configuration differs at least to a threshold degree from the second type of smart home device configuration; and
wherein the recommendation indicates configuration options including the second type of smart home device configuration and the third type of smart home device configuration based at least in part on the third type of smart home device configuration differing at least to the threshold degree from the second type of smart home device configuration.

11. The method of claim 5, further comprising:
determining, based at least in part on the second type of smart home device configuration:
a naming identifier to associate with the first device, the naming identifier differing from a previous naming identifier associated with the first device when the first device was in the first type of smart home device configuration; and
a device type to associate with the first device, the device type differing from a previous device type associated with the first device when the first device was in the first type of smart home device configuration; and
causing user account data to indicate that the first device is associated with the naming identifier and the device type based at least in part on receiving user input data accepting the recommendation.

12. The method of claim 5, further comprising:
determining that the second smart home functionality associated with the first device when in the second type of smart home device configuration is associated with a second device;
determining, from user account data associated with the first device, that user account data indicates an absence of the second device, wherein the recommendation includes an indicator that the second device is recommended to be acquired to perform the second smart home functionality; and
causing a purchase of the second device to be performed based at least in part on receiving user input data accepting the recommendation.

13. A system, comprising:
one or more processors; and
non-transitory computer-readable media storing computer-executable instructions that, when executed by the one or more processors, cause the one or more processors to perform operations comprising:
determining characteristics of a first type of smart home device configuration for a first device based at least in part on a device type of the first device and a naming indicator of the first device;

predicting, based at least in part on the characteristics of the first type of smart home device configuration for the first device, first data including usage data for the first device, the device type of the first device, and the naming indicator of the first device, that the first type of smart home device configuration for the first device is likely to result in usage of the first device lapsing during a future period of time;

determining second data indicating a second type of smart home device configuration for the first device indicated to result in the usage of the first device during the future period of time, wherein the first type of smart home device configuration is associated with first smart home functionality and the second type of smart home device configuration is associated with second smart home functionality that differs at least in part from the first smart home functionality; and sending third data representing a recommendation to transition the first device from being associated with the first type of smart home device configuration to being associated with the second type of smart home device configuration.

14. The system of claim 13, the operations further comprising:

determining a number of times that an action is performed by the first device in response to user input; and determining a time of day that the action is performed by the first device;

wherein predicting that the first type of smart home device configuration for the first device is likely to result in usage of the first device lapsing is further based at least in part on the number of times that an action is performed by the first device in response to user input and the time of day that the action is performed by the first device.

15. The system of claim 13, the operations further comprising:

determining fourth data indicating a number of actions performed by at least one of the first device or a second device that differed from a requested action associated with speech input; and wherein predicting that the first type of smart home device configuration is likely to result in the usage of the first device lapsing comprises predicting that the first type of smart home device configuration is likely to result in the usage of the first device lapsing based at least in part on the fourth data.

16. The system of claim 13, the operations further comprising:

determining the second smart home functionality that is yet to be enabled in associated with the first device;

determining that the second smart home functionality is associated with the second type of smart home device configuration of the first device, wherein the recommendation includes an indicator of the second smart home functionality; and based at least in part on user input data accepting the recommendation, causing the second smart home functionality to be enabled in association with the first device.

17. The system of claim 13, the operations further comprising:

receiving audio data representing speech input received at the first device;

determining, from fourth data indicating a context associated with the speech input, that the speech input is associated with the second type of smart home device configuration; and causing the recommendation to be output with a response to the speech input based at least in part on the speech input being associated with the second type of smart home device configuration.

18. The system of claim 13, the operations further comprising:

determining a third type of smart home device configuration of the first device indicated to result in the usage of the first device during the future period of time;

determining that the third type of smart home device configuration differs at least to a threshold degree from the second type of smart home device configuration; and wherein the recommendation indicates configuration options including the second type of smart home device configuration and the third type of smart home device configuration based at least in part on the third type of smart home device configuration differing at least to the threshold degree from the second type of smart home device configuration.

19. The system of claim 13, the operations further comprising:

determining, based at least in part on the second type of smart home device configuration:

a naming identifier to associate with the first device, the naming identifier differing from a previous naming identifier associated with the first device when the first device was in the first type of smart home device configuration; and a device type to associate with the first device, the device type differing from a previous device type associated with the first device when the first device was in the first type of smart home device configuration; and causing user account data to indicate that the first device is associated with the naming identifier and the device type based at least in part on receiving user input data accepting the recommendation.

20. The system of claim 13, the operations further comprising:

determining, based at least in part on user account data, a user classification indicating attributes of prior device usage; and wherein determining the second data indicating the second type of smart home device configuration of the first device comprises determining the second data indicating the second type of smart home device configuration of the first device based at least in part on the user classification.

* * * * *